(12) United States Patent
Chen et al.

(10) Patent No.: US 12,476,759 B2
(45) Date of Patent: Nov. 18, 2025

(54) SOUNDING REFERENCE SIGNAL (SRS) RESOURCE INDICATOR (SRI) ASSOCIATION FOR CONFIGURED-GRANT (CG)-BASED TRANSMISSION AND RECEPTION POINT (TRP) PHYSICAL UPLINK SHARED CHANNEL (PUSCH) TRANSMISSION

(71) Applicant: QUALCOMM Incorporated, San Diego, CA (US)

(72) Inventors: Yitao Chen, San Marcos, CA (US); Mostafa Khoshnevisan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/667,659

(22) Filed: May 17, 2024

(65) Prior Publication Data
US 2025/0070932 A1    Feb. 27, 2025

Related U.S. Application Data

(63) Continuation of application No. 17/393,192, filed on Aug. 3, 2021, now Pat. No. 11,991,106.

(51) Int. Cl.
*H04L 5/00* (2006.01)
*H04W 72/14* (2009.01)
*H04W 72/23* (2023.01)

(52) U.S. Cl.
CPC ........... *H04L 5/0048* (2013.01); *H04W 72/23* (2023.01)

(58) Field of Classification Search
None
See application file for complete search history.

(56) References Cited

U.S. PATENT DOCUMENTS

| | | |
|---|---|---|
| 2021/0367730 A1 | 11/2021 | Chen et al. |
| 2022/0201619 A1 | 6/2022 | Yao et al. |

(Continued)

FOREIGN PATENT DOCUMENTS

| | | |
|---|---|---|
| EP | 3771258 A1 | 1/2021 |
| EP | 3952484 A1 | 2/2022 |

(Continued)

OTHER PUBLICATIONS

International Search Report and Written Opinion—PCT/US2022/073652—ISA/EPO—Oct. 17, 2022.

*Primary Examiner* — Duc T Duong
(74) *Attorney, Agent, or Firm* — Paul M. McAdams; Holland & Hart LLP

(57) ABSTRACT

Methods, systems, and devices for sounding reference signal (SRS) resource indicator (SRI) association for configured grant (CG) based transmission and reception point (TRP) physical uplink shared channel (PUSCH) transmission are described. In some examples, a user equipment (UE) may receive first control signaling indicating a first and second sounding reference signal (SRS) resource set associated with a first and second set of power control parameter, respectively. The UE may receive second control signaling indicating a CG configuration, the first and second power control parameters for transmissions in the CG configuration. In some examples, the UE may determine a configuration status for one or more fields the first control signaling, the second control signaling, or both. The UE may select an SRS resource set based on the configuration status and may transmit one or more CG uplink transmissions with the CG configuration using the selected SRS resource set.

17 Claims, 15 Drawing Sheets

(56) References Cited

U.S. PATENT DOCUMENTS

| | | | |
|---|---|---|---|
| 2022/0295418 A1 | 9/2022 | Okamura et al. | |
| 2022/0322393 A1 | 10/2022 | Lin et al. | |
| 2022/0346028 A1 | 10/2022 | Cirik et al. | |
| 2022/0361224 A1 | 11/2022 | Cirik et al. | |
| 2022/0369235 A1 | 11/2022 | Chen | |
| 2022/0408371 A1 | 12/2022 | Matsumura et al. | |
| 2023/0012515 A1 | 1/2023 | Jiang et al. | |
| 2023/0023982 A1 | 1/2023 | Kim et al. | |
| 2023/0024375 A1 | 1/2023 | Yao et al. | |
| 2023/0035143 A1 | 2/2023 | Cirik et al. | |
| 2023/0043507 A1 | 2/2023 | Chen et al. | |
| 2023/0048026 A1 | 2/2023 | Huang et al. | |
| 2023/0053727 A1 | 2/2023 | Huang | |
| 2023/0063015 A1 | 3/2023 | Muruganathan et al. | |
| 2023/0079502 A1 | 3/2023 | Cha et al. | |
| 2023/0136891 A1 | 5/2023 | Zhang et al. | |
| 2023/0156688 A1 | 5/2023 | Kuang et al. | |
| 2023/0179333 A1* | 6/2023 | Cirik | H04W 52/146 |
| 2023/0216632 A1* | 7/2023 | Go | H04L 5/0094 370/329 |
| 2023/0239843 A1 | 7/2023 | Liu et al. | |
| 2023/0261835 A1 | 8/2023 | Shi et al. | |
| 2023/0284230 A1* | 9/2023 | Cirik | H04L 5/0048 370/328 |
| 2023/0309022 A1* | 9/2023 | Ling | H04W 52/146 |
| 2023/0353307 A1 | 11/2023 | Tian et al. | |
| 2023/0370219 A1* | 11/2023 | Ling | H04L 5/0053 |
| 2024/0015665 A1* | 1/2024 | Chen | H04L 5/00 |
| 2024/0057112 A1* | 2/2024 | Deghel | H04L 5/0035 |
| 2024/0098740 A1* | 3/2024 | Muruganathan | H04L 5/0044 |
| 2024/0114504 A1* | 4/2024 | Gao | H04W 72/1268 |
| 2024/0178965 A1* | 5/2024 | Gao | H04L 5/0048 |
| 2024/0187995 A1* | 6/2024 | Ling | H04W 52/146 |
| 2024/0260031 A1* | 8/2024 | Matsumura | H04L 1/08 |
| 2024/0283616 A1* | 8/2024 | Gao | H04W 72/21 |
| 2024/0298271 A1* | 9/2024 | Gao | H04W 52/365 |
| 2024/0314704 A1* | 9/2024 | Li | H04W 52/242 |
| 2024/0314773 A1* | 9/2024 | Matsumura | H04W 24/00 |
| 2024/0323953 A1* | 9/2024 | Gao | H04L 1/1864 |
| 2024/0323976 A1* | 9/2024 | Gao | H04W 72/232 |
| 2024/0333460 A1* | 10/2024 | Xiao | H04L 5/0094 |
| 2025/0089055 A1* | 3/2025 | Liu | H04L 5/0035 |
| 2025/0106778 A1* | 3/2025 | Liu | H04W 52/40 |

FOREIGN PATENT DOCUMENTS

| | | |
|---|---|---|
| EP | 4057560 A1 | 9/2022 |
| WO | WO2020199956 A1 | 10/2020 |
| WO | WO2021088877 A1 | 5/2021 |

* cited by examiner

SOUNDING REFERENCE SIGNAL (SRS) RESOURCE INDICATOR (SRI) ASSOCIATION FOR CONFIGURED-GRANT (CG)-BASED TRANSMISSION AND RECEPTION POINT (TRP) PHYSICAL UPLINK SHARED CHANNEL (PUSCH) TRANSMISSION

CROSS REFERENCE

The present Application for Patent is a continuation of U.S. patent application No. 17/393,192 by ChenN et al., entitled "SOUNDING REFERENCE SIGNAL (SRS) RESOURCE INDICATOR (SRI) ASSOCIATION FOR CONFIGURED-GRANT (CG)-BASED TRANSMISSION AND RECEPTION POINT (TRP) PHYSICAL UPLINK SHARED CHANNEL (PUSCH) TRANSMISSION," filed Aug. 3, 2021, assigned to the assignee hereof, and expressly incorporated by reference in its entirety herein.

TECHNICAL FIELD

The following relates to wireless communications, including sounding reference signal (SRS) resource indicator (SRI) association for configured grant (CG)-based transmission and reception point (TRP) physical uplink shared channel (PUSCH) transmission.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a base station may configure a UE with a CG configuration for CG uplink transmissions. In the case in which the CG configuration is of a type, such as a Type 1 configured grant, the base station may transmit the CG configuration as radio resource control (RRC) signaling that may both configure and activate the CG uplink transmissions. Because there may not be related downlink control information (DCI) signaling for some CG signaling, instead, sounding reference signal (SRS) resource indicator (SRI) information, precoding information, and a quantity of layers may be provided by RRC-based parameters in the RRC signaling. In some cases, the UE may receive such RRC-based parameters in the RRC signaling, but may not be configured to efficiently or effectively interpret the SRI, the precoding information, or the quantity of layers. For example, the UE may be configured with more than one SRS resource set so the UE may have difficulty determining which SRS resource set to use when interpreting the SRI, the precoding information, and the quantity of layers, among other information. In some cases, the base station may configure the UE with multiple sets of RRC-based parameters, for example, multiple parameters associated with multiple SRI fields, multiple precoding information fields, and multiple quantities of layers. In such cases, the complexity for determining an association between the SRS resource sets and the RRC-based parameters may increase relative to cases having a single SRS resource set. Further, if configured with more than one SRS resource set, the UE may have difficulty determining a mapping between the SRS resource sets and uplink transmissions.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method includes receiving first control signaling indicating a first sounding reference signal (SRS) resource set associated with a first set of power control parameters and a second SRS resource set associated with a second set of power control parameters, receiving second control signaling indicating a configured grant (CG) configuration, the first set of power control parameters and the second set of power control parameters being for uplink transmissions and associated with the CG configuration, determining a configuration status of each of one or more fields in radio resource control (RRC) signaling based on one or both of the first control signaling or the second control signaling, selecting a SRS resource set from the first SRS resource set or the second SRS resource set based on the configuration statuses, and transmitting one or more uplink transmissions on a physical uplink shared channel (PUSCH) associated with the CG configuration using the SRS resource set selected from the first SRS resource set or the second SRS resource set.

Another innovative aspect of the subject matter described in this disclosure can be implemented in an apparatus for wireless communication. The apparatus includes a processor, memory coupled with the processor, and instructions stored in the memory. The instructions may be executable by the processor to cause the apparatus to receive first control signaling indicating a first SRS resource set associated with a first set of power control parameters and a second SRS resource set associated with a second set of power control parameters, receive second control signaling indicating a CG configuration, the first set of power control parameters and the second set of power control parameters being for uplink transmissions and associated with the CG configuration, determine a configuration status of each of one or more fields in RRC signaling based on one or both of the first control signaling or the second control signaling, select a SRS resource set from the first SRS resource set or the second SRS resource set based on the configuration statuses, and transmit one or more uplink transmissions on a PUSCH associated with the CG configuration using the SRS resource set selected from the first SRS resource set or the second SRS resource set.

Another innovative aspect of the subject matter described in this disclosure can be implemented in an apparatus for wireless communication. The apparatus includes means for receiving first control signaling indicating a first SRS resource set associated with a first set of power control parameters and a second SRS resource set associated with a second set of power control parameters, means for receiving second control signaling indicating a CG configuration, the first set of power control parameters and the second set of power control parameters being for uplink transmissions and associated with the CG configuration, means for determining a configuration status of each of one or more fields in RRC signaling based on one or both of the first control signaling or the second control signaling, means for selecting a SRS resource set from the first SRS resource set or the second SRS resource set based on the configuration statuses, and means for transmitting one or more uplink transmissions on a PUSCH associated with the CG configuration using the SRS resource set selected from the first SRS resource set or the second SRS resource set.

Another innovative aspect of the subject matter described in this disclosure can be implemented in a non-transitory computer-readable medium storing code for wireless communication. The non-transitory computer-readable medium storing code includes instructions executable by a processor to receive first control signaling indicating a first SRS resource set associated with a first set of power control parameters and a second SRS resource set associated with a second set of power control parameters, receive second control signaling indicating a CG configuration, the first set of power control parameters and the second set of power control parameters being for uplink transmissions and associated with the CG configuration, determine a configuration status of each of one or more fields in RRC signaling based on one or both of the first control signaling or the second control signaling, select a SRS resource set from the first SRS resource set or the second SRS resource set based on the configuration statuses, and transmit one or more uplink transmissions on a PUSCH associated with the CG configuration using the SRS resource set selected from the first SRS resource set or the second SRS resource set.

In some examples of the method, apparatuses, and non-transitory computer-readable medium described herein, determining the configuration statuses of the one or more fields in the RRC signaling may include operations, features, means, or instructions for determining that one or more second fields of the one or more fields may be not configured.

In some examples of the method, apparatuses, and non-transitory computer-readable medium described herein, selecting the SRS resource set may include operations, features, means, or instructions for selecting the first SRS resource set based on one or more first fields of the being associated with the first SRS resource set.

In some examples of the method, apparatuses, and non-transitory computer-readable medium described herein, the one or more fields include one or both of an SRS resource indicator field or a precoding and number of layers field.

Some examples of the method, apparatuses, and non-transitory computer-readable medium described herein may further include operations, features, means, or instructions for receiving third control signaling indicating that the one or more fields may be associated with one of the first SRS resource set or the second SRS resource set.

In some examples of the method, apparatuses, and non-transitory computer-readable medium described herein, the one or more fields include one or both of a SRS resource indicator field or a precoding and number of layers field, and one or both of the first control signaling or the second control signaling include the third control signaling.

In some examples of the method, apparatuses, and non-transitory computer-readable medium described herein, determining the configuration statuses of the one or more fields in the RRC signaling may include operations, features, means, or instructions for determining that one or more second fields of the one or more fields may be configured.

Some examples of the method, apparatuses, and non-transitory computer-readable medium described herein may further include operations, features, means, or instructions for determining that one or more first fields of the one or more fields in the RRC signaling may be associated with the first SRS resource set and that the one or more second fields of the one or more fields in the RRC signaling may be associated with the second SRS resource set, where selecting the SRS resource set from the first SRS resource set or the second SRS resource set may be based on determining that the one or more first fields may be associated with the first SRS resource set and that the one or more second fields may be associated with the second SRS resource set.

In some examples of the method, apparatuses, and non-transitory computer-readable medium described herein, selecting the SRS resource set may include operations, features, means, or instructions for selecting the SRS resource set based on a fixed order for the one or more uplink transmissions.

In some examples of the method, apparatuses, and non-transitory computer-readable medium described herein, selecting the SRS resource set based on the fixed order for the one or more uplink transmissions may include operations, features, means, or instructions for selecting the first SRS resource set for a first uplink transmission in time of the one or more uplink transmissions and selecting the first SRS resource set or the second SRS resource set for one or more second uplink transmissions in time of the one or more uplink transmissions based on a mapping type.

In some examples of the method, apparatuses, and non-transitory computer-readable medium described herein, the mapping type includes a cyclic mapping of the first SRS resource set and the second SRS resource set.

In some examples of the method, apparatuses, and non-transitory computer-readable medium described herein, the mapping type includes a sequential mapping of the first SRS resource set and the second SRS resource set.

Some examples of the method, apparatuses, and non-transitory computer-readable medium described herein may further include operations, features, means, or instructions for receiving third control signaling having a field indicating that the first uplink transmission in time of the one or more uplink transmissions may be associated with one of the first SRS resource set or the second SRS resource set, where transmitting the one or more uplink transmissions may be based on the third control signaling.

Some examples of the method, apparatuses, and non-transitory computer-readable medium described herein may further include operations, features, means, or instructions for receiving third control signaling having a field indicating one of a fixed set of preconfigured mapping options associated with one or both of the first SRS resource set or the second SRS resource set.

In some examples of the method, apparatuses, and non-transitory computer-readable medium described herein, the fixed set of preconfigured mapping options includes one or more of a first uplink transmission in time of the one or more uplink transmissions associated with the first SRS resource set and a second uplink transmission in time of the one or more uplink transmissions associated with the second SRS resource set, a first uplink transmission in time of the one or more uplink transmissions associated with the second SRS resource set and a second uplink transmission in time of the one or more uplink transmissions associated with the first SRS resource set, the one or more uplink transmissions associated with the first SRS resource set, or the one or more uplink transmissions associated with the second SRS resource set.

In some examples of the method, apparatuses, and non-transitory computer-readable medium described herein, the CG configuration includes a Type 1 CG PUSCH configuration.

In some examples of the method, apparatuses, and non-transitory computer-readable medium described herein, the one or more fields in the RRC signaling includes one or more of a SRS resource indicator field, a precoding and number of layers field, or a pathloss reference index field.

In some examples of the method, apparatuses, and non-transitory computer-readable medium described herein, the RRC signaling includes one or both of the first control signaling or the second control signaling.

In some examples of the method, apparatuses, and non-transitory computer-readable medium described herein, receiving the second control signaling indicating the CG configuration may include operations, features, means, or instructions for receiving second control signaling indicating a CG PUSCH configuration.

In some examples of the method, apparatuses, and non-transitory computer-readable medium described herein, the one or more uplink transmissions include codebook PUSCH transmissions or non-codebook PUSCH transmissions.

DETAILED DESCRIPTION

Figure 1:
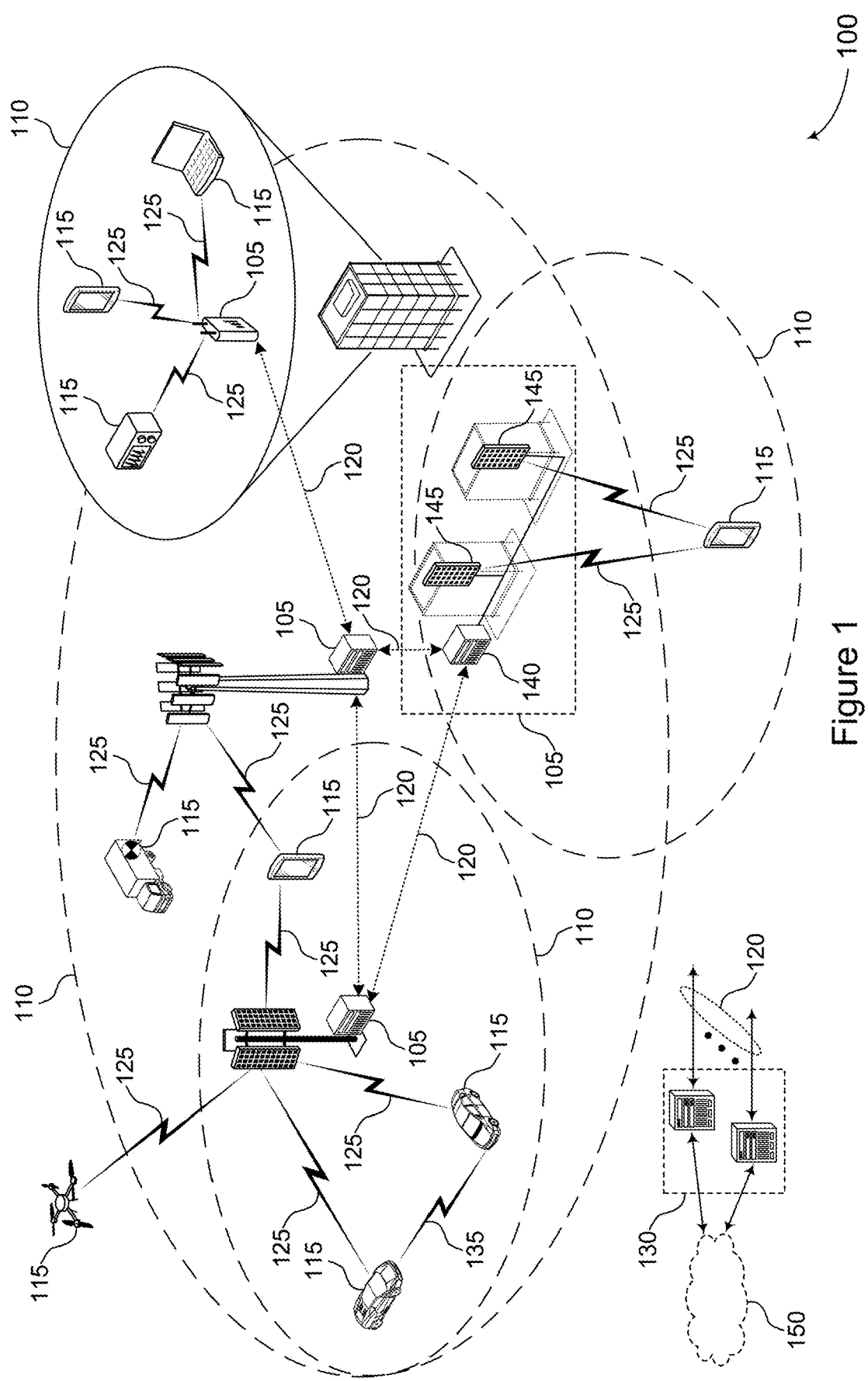
FIGS. 1-3B illustrate examples of wireless communications systems that support sounding reference signal (SRS) resource indicator (SRI) association for configured grant (CG)-based transmission and reception point (TRP) physical uplink shared channel (PUSCH) transmission in accordance with aspects of the present disclosure.

In some wireless communications systems, a base station may configure a user equipment (UE) with a configured grant (CG) configuration providing the UE with information associated with transmitting one or more uplink transmissions (for example, CG uplink transmissions). For example, the base station may transmit a radio resource control (RRC) signal, to the UE, including the CG configuration which the UE references, or otherwise uses to transmit CG uplink transmissions. To support the transmission of CG uplink transmissions, the base station may provide the UE with two or more sounding reference signal (SRS) resource sets that the UE may use to transmit CG uplink transmissions. The SRS resource sets may include one or more SRS resources, the one or more SRS resources corresponding to respective spatial domain filters associated with different beams. The UE may use such beams to transmit the CG uplink transmissions. In some examples, the CG configuration may be associated with a Type 1 CG. In contrast to Type 2 CG (for which a base station first transmits an RRC signal including SRS resource sets and then later transmits DCI signaling activating the SRS resource sets), for Type 1 CG, the base station doesn't need to transmit DCI signaling because the base station transmits RRC signaling including information otherwise provided in a DCI signal activating the SRS resource sets as is the case for Type 2 CG. For example, the base station may transmit the RRC signal, to the UE, including a Type 1 CG configuration, in which the base station may include an SRS resource indicator (SRI), precoding information, and a rank within a first set of RRC fields (for example, such as an srs-ResourceIndicator field and a precodingAndNumberOfLayers field).

For multiple transmission and reception point (TRP) configurations, the base station may include a second set of RRC fields within the Type 1 CG configuration, for example, configuring the UE with the first set of RRC fields for transmitting CG uplink transmissions to a first TRP, a second set of RRC fields for transmitting CG uplink transmissions to a second TRP, and so on, such that the base station may receive different uplink transmissions at different TRPs. However, in some cases, the UE may have difficulty determining, or may not be configured to determine, which SRS resource set to use in interpreting the first set of RRC fields, the second set of RRC fields, or the like. That is, it may be ambiguous to the UE which SRS resource set to use for the UE for applying the information included in the first set of RRC fields, the second set of RRC fields, or the like, to the CG uplink transmissions. As such, in interpreting a first parameter (for example, within the first set of RRC fields such as an srs-ResourceIndicator parameter), the UE may have difficulty in determining whether to use the first SRS resource set or the second SRS resource set. Additionally, interpreting a second parameter (for example, within the first set of RRC fields such as a precodingAndNumberOfLayers parameter), may depend on a quantity of SRS ports and a selected SRS resource, and as such, the UE may have difficulty in determining whether to use the first SRS resource set or the second SRS resource set.

Various aspects generally relate to a UE determining which SRS resource set to use to interpret one or more RRC fields in a CG configuration received from a base station. The base station may transmit RRC signaling, to the UE, including a Type 1 CG configuration and in accordance with a configuration status of each of one or more RRC fields (for example, a first set of RRC fields and a second set of RRC fields). For example, the base station may configure the UE with a first SRS resource set associated with a first set of power control parameters (for example, a target power spectral density, a fractional power control indicator, a closed loop index) and a second SRS resource set associated with a second set of power control parameters and the base station may refrain from providing the UE with information otherwise included in the second set of RRC fields of the CG configuration. That is, the second set of RRC fields may not be configured. For example, the base station may use a single TRP (sTRP) configuration such that the base station may refrain from including information within the second set of RRC fields of the CG configuration. That is, the base station may leave the second set of RRC fields devoid of information that the UE may use to transmit CG uplink transmissions. Alternatively, the base station may refrain from including the second set of RRC fields in the CG configuration altogether. The base station may similarly refrain from providing the UE with information otherwise included in a third set of RRC fields, a fourth set of RRC fields, and so on. As such, the UE may identify the first set of RRC fields and may associate the first set of RRC fields with the first SRS resource set. For example, the first SRS resource set is the SRS resource set with a lower SRS resource set identifier (ID), as compared to the SRS resource set ID of a second SRS resource set, and the UE associates the first set of RRC fields with the SRS resource set with the lower SRS resource set ID. In some other examples, the base station may include an indication (an explicit indication or an implicit indication), within RRC signaling indicating the CG configuration that may indicate which SRS resource set is associated with the first set of RRC fields. In other words, the base station may include an additional indication, such as an additional field within RRC signaling, indicating to the UE whether to use the first SRS resource set or the second SRS resource set in interpreting the first set of RRC fields.

In some other examples, the base station configures the UE with multiple SRS resource sets and the base station provides the UE with the information associated with the second set of RRC fields. That is, the second set of RRC fields may be configured. In some such examples, the base station may use a multiple TRP (mTRP) configuration such that the base station includes the second set of RRC fields within the CG configuration. In such examples, the UE may determine that the first SRS resource set corresponds to the first set of RRC fields and that the second SRS resource set corresponds to the second set of RRC fields, as opposed to other different examples in which the UE may not be configured to explicitly associate the SRS resource sets with respective sets of RRC fields. In examples in which the UE is configured with both the first set of RRC fields and the second set of RRC fields, the UE may be configured to use a mapping between uplink transmissions and the SRS resource sets. For example, the UE may be configured to use a mapping between a fixed order of CG uplink transmissions and the SRS resource sets. That is, the UE may transmit a first CG uplink transmission using the first SRS resource set and the first set of power control parameters and may transmit the remaining CG uplink transmissions using different SRS resource sets corresponding to a mapping type, which may be an RRC-configured mapping type, for example, a cyclic mapping, a sequential mapping, or any other mapping type. As another example, the UE may receive control information indicating an SRS resource set order associated with transmitting CG uplink transmissions. For example, the base station may transmit an additional RRC field (for example, within the RRC signal including the CG configuration) indicating whether the first CG uplink transmission is associated with the first SRS resource set or the second SRS resource set. Alternatively, the base station may transmit the control information indicating the SRS resource set order within an RRC message different from the RRC signal including the CG configuration. As yet another example, the UE may receive an RRC message indicating one of a limited quantity (for example, four) of possible mapping configurations (for example, dynamic switching possibilities) that should be used by the UE. That is, the base station may dynamically transmit, to the UE, an explicit indication of one of the limited quantity of possible mapping configurations preconfigured at the UE that should be used by the UE.

Particular implementations of the subject matter described in this disclosure can be implemented to realize one or more of the following potential advantages. By configuring UEs to determine an association between SRS resource sets and corresponding RRC fields, aspects of the present disclosure may improve the efficiency of CG uplink transmissions in wireless networks, such as 5G networks. For example, a base station may configure a UE with two SRS resource sets and the UE may more efficiently associate particular SRS resource sets with respective RRC parameters associated with CG uplink transmissions compared to other different techniques in which the UE may not be configured by the base station to associate SRS resource sets with RRC parameters. The UE may use particular SRS resource sets, or combinations thereof, in accordance with RRC signaling from the base station, to interpret RRC parameters and transmit CG uplink transmissions to the base station using the SRS resource sets and referencing the RRC parameters. In some implementations, the UE may further transmit the CG uplink transmissions based on one or more interference conditions, TRP configurations, configured beams, power modes, or any other channel altering conditions. As such, UEs configured to perform such techniques may mitigate ambiguity in interpreting RRC parameters associated with CG uplink transmissions. Further, UEs using such techniques may transmit CG uplink transmissions a determined mapping pattern, a possible mapping configuration (for example, a dynamic switching possibility), or both, resulting in more efficient and effective reception of CG uplink transmissions at the base station.

Aspects of the disclosure are initially described in the context of wireless communications systems. Aspects of the disclosure are also described in the context of process flows. Aspects of the disclosure are further illustrated by and described with reference to apparatus diagrams, system diagrams, and flowcharts that relate to SRI association for CG-based TRP physical uplink shared channel (PUSCH) transmission.

FIG. 1 illustrates an example of a wireless communications system 100 that supports SRI association for CG-based TRP PUSCH transmission in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR).

Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol duration (for example, a duration of one modulation symbol) and one subcarrier, in which the symbol duration and subcarrier spacing are inversely related. The number of bits carried by each resource element may depend on the modulation scheme (for example, the order of the modulation scheme, the coding rate of the modulation scheme, or both). As such, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in which a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling duration of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol durations (for example, depending on the length of the cyclic prefix prepended to each symbol duration). In some wireless communications systems 100, a slot may further be divided into multiple mini-slots containing one or more symbols. Excluding the cyclic prefix, each symbol duration may contain one or more (for example, $N_f$) sampling durations. The duration of a symbol duration may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol durations in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol durations and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable may provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode if not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) if receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, if receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

In some cases, a base station 105 may configure a UE 115 with a CG configuration for CG uplink transmissions. For example, the base station 105 may transmit the CG configuration indicating a type of a CG, such as a Type 1 CG, using RRC signaling that configures and activates the CG uplink transmissions. To support CG uplink transmissions, the base station 105 may configure the UE 115 with one or more SRS resource sets that the UE 115 may reference if transmitting uplink information to the base station 105. In some cases, the UE 115 may have difficulty in determining (for example, may not be configured to determine) which SRS resource set to use in interpreting RRC parameters configured by the base station 105. That is, it may be ambiguous, to the UE 115, which SRS resource set to use if applying CG uplink transmission related RRC parameters (for example, first parameters such as a first srs-ResourceIndicator parameter and a first precodingAndNumberOfLayers parameter) to one or more uplink transmissions. For example, in interpreting a srs-ResourceIndicator parameter, it may be ambiguous to the UE whether to use a first SRS resource set or a second SRS resource set. Similarly, for the second parameter such as the precodingAndNumberOfLayers parameter, as the interpretation of such a parameter may depend on a quantity of SRS ports, and a selected SRS resource, such that the UE may have difficulty in determining the SRS resource set to use. Further, in cases in which the base station 105 may use an mTRP configuration, the base station 105 may transmit a second set of RRC parameters or a second set of RRC fields (for example, second fields such as a second srs-ResourceIndicator field and a second field such as a second precodingAndNumberOfLayers field). As such, the UE 115 may experience increased difficulty in interpreting such RRC signaling.

In some examples, the UE 115 may be configured to determine which SRS resource set to use if interpreting the CG configuration. For example, the base station 105 may configure the UE 115 with multiple SRS resource sets, such as two SRS resource sets, and the base station 105 may refrain from configuring the second set of RRC fields. For example, the base station 105 may use an sTRP configuration, or any other configuration, such that the base station 105 may refrain from configuring the UE 115 with the second set of RRC fields. In such an example, the UE 115 may associate the first set of RRC fields with the first SRS resource set. Additionally or alternatively, in some examples, the base station 105 may include an explicit indication within the CG configuration that may indicate which SRS resource set may be associated with the first set of RRC fields.

In other examples, the base station 105 may configure the UE 115 with two SRS resource sets and the base station 105 may configure the second set of RRC fields. For example, the base station 105 may use an mTRP configuration, or any other configuration, such that the base station 105 may configure the UE 115 with the second set of RRC fields. In such an example, the UE 115 may determine that the first SRS resource set corresponds to the first set of RRC fields and that the second SRS resource set corresponds to the second set of RRC fields. In examples in which the UE 115 may be configured with both the first set of RRC fields and the second set of RRC fields, the UE 115 may be configured to use a determined mapping between uplink transmissions and SRS resource sets.

Figure 2:
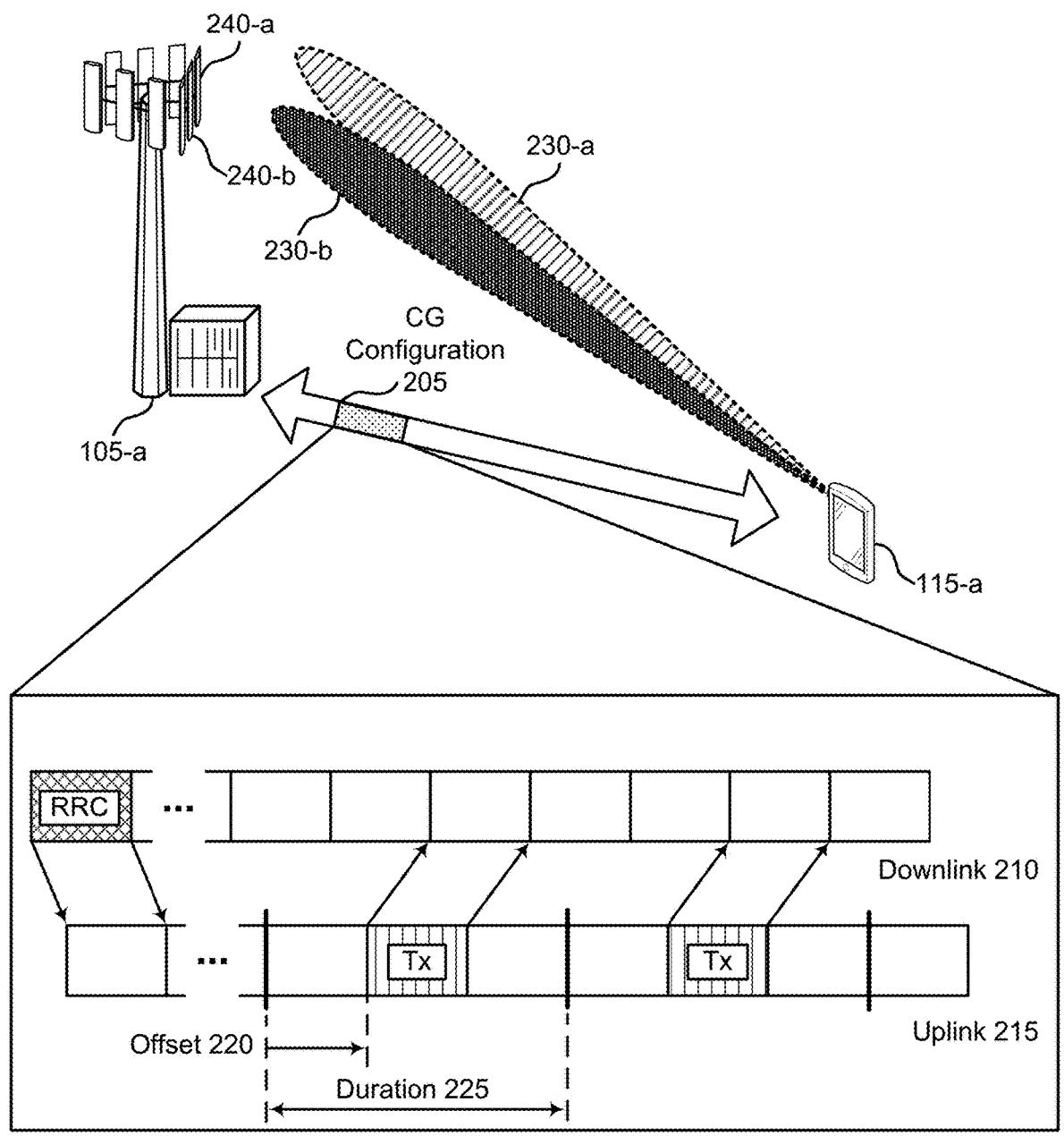

FIG. 2 illustrates an example of a wireless communications system 200 that supports SRI association for CG-based TRP PUSCH transmission in accordance with aspects of the present disclosure. The wireless communications system 200 may implement or be implemented to realize aspects of the wireless communications system 100. For example, the wireless communications system 200 may illustrate communications between a UE 115-*a* and a base station 105-*a*, which may be examples of corresponding devices, including with reference to FIG. 1. The base station 105-*a* may configure the UE 115-*a* with a CG configuration 205 for multiple CG uplink transmissions using multiple beams 230 that may be directed towards respective TRPs 240 at the base station 105-*a*. In some examples, the UE 115-*a* may associate each CG uplink transmission with an SRS resource set 235. As such, the UE 115-*a* may follow techniques described herein to transmit the CG uplink transmissions using the correct SRS resource set 235 or order of SRS resource sets 235.

In the wireless communications system 200, the base station 105-*a* may configure the UE 115-*a* with a CG configuration 205 for CG uplink transmissions. In some examples, the base station 105-*a* may transmit the CG configuration 205 to the UE 115-*a* via RRC signaling, such as the RRC signaling illustrated as being sent by the base station 105-*a* over a downlink 210. The base station 105-*a* may indicate, via the CG configuration 205, whether a CG uplink transmission is associated with a Type 1 CG (which may be equivalently referred to as an uplink CG Type 1) or a Type 2 CG (which may be equivalently referred to as an uplink CG Type 2). For example, the base station 105-*a* may transmit the CG configuration 205 which may indicate either a Type 1 CG or a Type 2 CG. In cases in which the CG configuration 205 indicates a Type 1 CG, the base station 105-*a* may, in addition to configuring uplink transmission parameters at the UE 115-*a* via RRC signaling, activate or deactivate a grant for the CG uplink transmissions via RRC signaling. In cases of Type 1 CG, the base station 105-*a* may also deactivate the CG configuration 205 via RRC signaling.

In cases in which the CG configuration 205 indicates a Type 1 CG, the CG configuration 205 may configure, indicate, or otherwise provide one or more transmission parameters to the UE 115-*a* that the UE 115-*a* may use for the CG uplink transmissions. For example, the base station 105-*a* may transmit the CG configuration 205 to the UE 115-*a* including or indicating one or both of a ConfiguredGrantConfig parameter or an rrc ConfiguredUplinkGrant parameter.

In some cases, base station 105-*a* may configure various transmission parameters corresponding to the CG uplink transmissions via the CG configuration 205. In some examples, the configured transmission power control parameters may include a value corresponding to the target power spectral density (for example, a P0 value), a value that indicates whether to enable or disable fractional power control for the CG uplink transmissions (for example, an alpha value), a closed loop index, or any combination thereof. As such, the base station 105-*a* may configure the power control parameters corresponding to the CG uplink transmissions in the CG configuration 205 (for example, via RRC signaling, such as a ConfiguredGrantConfig message). For example, the ConfiguredGrantConfig message may include a p0-PUSCH-Alpha field which may configure the P0 value and the alpha value and may also include a powerControlLoopToUse field which may configure the closed loop index value for the CG uplink transmission. Further, the CG configuration 205 may indicate one or more of an offset 220, a duration 225, or any other parameter, which may schedule the UE 115-*a* to signal uplink transmissions (for example, Txs as illustrated in uplink 215) over specific durations (for example, slots, spans, symbols, transmission time intervals (TTIs)). For example, in wireless communications system 200, the UE 115-*a* may be configured with a TTI spanning three slots. That is, the duration 225 of the TTI may be three slots. Further, in such examples, the UE 115-*a* may be configured with an offset 220 of one slot. As such, the UE 115-*a* may be configured to transmit uplink information (for example, CG uplink transmissions) over the second slot of the configured TTI.

In some cases, the UE 115-*a* may also receive, from the base station 105-*a* via the CG configuration 205, a configuration of a path loss reference signals (PL-RS). In cases in which the CG configuration 205 indicates the Type 1 CG, the base station 105-*a* may configure an initial transmission via a pathlossReferenceIndex field in an rrc-ConfiguredUplinkGrant parameter. In some cases, the base station 105-*a* may request retransmission of the CG uplink transmissions from the UE 115-*a* via a scheduling DCI message which may include an SRI field that indicates the PL-RS configuration.

The UE 115-*a* may be configured to transmit CG uplink transmissions in accordance with a "codebook" based transmission or a "non-codebook" based transmission. As such, the UE 115-*a* may be configured to use an SRS resource set 235 with a usage set to codebook or non-codebook, respectively. In cases in which the SRS resource set 235 has a usage set to codebook, the UE 115-*a* may be configured with an SRS resource limit. For example, the UE 115-*a* may be configured with, for example, a quantity of SRS resources, such as a limited quantity of four SRS resources, within the SRS resource set 235. In such an example, each SRS resource may be RRC configured (for example, via RRC signaling from the base station 105-*a*) with a quantity of ports (for example, indicated by a parameter: nrofSRS-Ports). In some cases, the base station 105-*a* may indicate a single SRS resource from the SRS resource set 235, within an uplink DCI message, such as a DCI message scheduling uplink retransmissions. In such cases, the quantity of ports configured for the indicated SRS resource, may indicate the quantity of antenna ports for CG uplink transmissions. Further, the UE 115-*a* may transmit PUSCH (for example, CG uplink transmissions) using a same spatial domain filter (for example, a same beam 230) as the SRS resource indicated by the base station 105-*a*. In some cases, the base station 105-*a* may indicate a rank and a precoder for PUSCH (for example, the CG uplink transmissions), to the UE 115-*a*. For example, the base station 105-*a* may transmit, within a DCI field different than the SRI field (for example, a field for precoding information and quantity of layers), a quantity of layers and a transmitted precoding matrix indicator (TPMI) for scheduled CG uplink transmissions.

In cases in which the SRS resource set 235 has a usage set to non-codebook, the UE 115-*a* may be configured with as SRS resource limit. For example, the UE 115-*a* may be configured to use, for example, a quantity of SRS resources, such as a limited quantity of four SRS resources. In such an example, each SRS resource may be associated with a single, respective port. In some cases, the base station 105-*a* may indicate one or more SRS resources, from the SRS resource set 235, within an uplink DCI message (for example, a retransmission scheduling DCI message). The quantity of SRS resources indicated in such a DCI may indicate the rank for the PUSCH the scheduling DCI message may be associated with. For example, the quantity of SRS resources indicated in a PUSCH scheduling DCI message may indicate, to the UE 115-*a*, the quantity of transmission layers the UE 115-*a* may use if transmitting CG uplink transmissions scheduled by such a DCI. Further, the PUSCH (for example, CG uplink transmissions) may be transmitted with a same precoder, spatial domain filter (for example, beam 230), and any other transmission parameter, associated with the one or more SRS resources indicated by the base station 105-*a*. In some cases, the base station 105-*a* may configure the UE 115-*a* with an SRS resource set 235 with a non-zero power (NZP) CSI-RS resource (for example, using RRC parameters associated with CSI-RSs). In such cases, the UE 115-*a* may determine (for example, calculate) a precoder used for the SRS resources within the SRS resource set 235 based on measuring the associated NZP CSI-RS resource.

In some examples, it may be advantageous for the base station 105-*a* to receive CG uplink transmissions from the UE 115-*a* at multiple TRPs 240 or multiple panels. For example, as a result of receiving the CG uplink transmissions from the UE 115-*a* at the multiple TRPs 240 or the multiple panels, the UE 115-*a* and the base station 105-*a* may support greater robustness and reliability for the CG uplink transmissions. For example, if a first TRP 240-*a* at the base station 105-*a* is blocked via a physical object (such as a tree, a moving car, a building, among other examples) or the first TRP 240-*a* experiences interference (such as interference from signaling from other UEs 115 or self-interference), the base station 105-*a* may decode the uplink transmissions at a second TRP 240-*b*, increasing uplink reception reliability at the base station 105-*a*. In some examples, the TRP 240-*b* may be located at a secondary base station 105, and the UE 115-*a* may transmit the CG uplink transmissions to multiple base stations 105. In other words, the TRP 240-*a* and the TRP 240-*b* may be located at same (or approximately the same) physical locations or may be located at different physical locations without exceeding the scope of the present disclosure.

Additionally or alternatively, the UE 115-*a* may transmit CG uplink transmissions with repetition. In some examples, the UE 115-*a* may receive (from the base station 105-*a* and, for example, via RRC signaling or DCI) signaling indicating a type of repetition that the UE 115-*a* may use for transmitting the CG uplink transmissions, such as a Type A repetition or a Type B repetition. In examples in which the UE 115-*a* receives signaling indicating the Type A repetition, the UE 115-*a* may transmit over different CG uplink transmission occasions that correspond to a same transport block and the different CG uplink transmission occasions may be in different slots. In examples in which the UE 115-*a* receives signaling indicating the Type B repetition, the UE 115-*a* may transmit different CG uplink transmission occasions that correspond to a same transport block and the different CG uplink transmission occasions may be in different mini-slots (which may be smaller in symbol size or duration than slots).

The base station 105-*a* may configure a quantity of repetitions for a CG uplink transmission via RRC signaling or dynamically via DCI (for example, via a time domain resource assignment (TDRA) field that is part of a DCI message). In some cases, the UE 115-*a* may transmit the repetitions of the CG uplink transmission using a same beam 230. For example, the UE 115-*a* may transmit the repetitions of the CG uplink transmission using a beam 230-*a* and the base station 105-*a* may receive the repetitions of the CG uplink transmission sent using the beam 230-*a* at a single TRP 240 (or, in some examples, may attempt to receive the single beam transmissions at multiple TRPs 240). In such examples in which the UE 115-*a* transmits the repetitions of the CG uplink transmission via the same beam 230, the UE 115-*a* may transmit the repetitions of the CG uplink transmission using a same set of transmission power control parameters.

In some other cases, if the base station 105-*a* intends to receive different uplink repetitions at different TRPs 240, different panels, or different antennas, the base station 105-*a* may configure the UE 115-*a* to use multiple beams 230 (such as the beam 230-*a* and a beam 230-*b*) and multiple sets of power control parameters. For example, repetitions of the CG uplink transmission may belong to or may be associated with multiple (for example, two) SRS resource sets 235 and each SRS resource set 235 may be associated with a beam 230 and a set of power control parameters. In other words, the scheduled or configured repetitions of the CG uplink transmission may be partitioned into two distinct sets of repetitions and the two sets of repetitions may correspond to two SRS resource sets 235 (such that each set of repetitions corresponds to a different SRS resource set 235 and, accordingly, a different beam 230 and a different set of power control parameters). As described herein, an SRS resource set 235-*a* may be associated with the beam 230 a and a first set of power control parameters and an SRS resource set 235-*b* may be associated with the beam 230-*b* and a second set of power control parameters. In some examples, and as a result of the correspondence between the two sets of repetitions and the two SRS resource sets 235, the base station 105-*a* may indicate two beams 230 or two sets of power control parameters, or both, for two sets of repetitions by two corresponding SRI fields in a DCI message (for example, a retransmission scheduling DCI for a Type 1 CG).

In some deployments, for example, the UE 115-*a* and the base station 105-*a* may support a dynamic switching between single-TRP (sTRP) operation and multi-TRP (mTRP) operation and the UE 115-*a* and the base station 105-*a* may leverage the correspondence between the two sets of repetitions and the two SRS resource sets 235 for the dynamic switching. In such deployments, the base station 105-*a* may alternate between an sTRP-based receiving of a PUSCH transmission and an mTRP-based receiving of the PUSCH transmission, which may include indicating the UE 115-*a* to use one SRS resource set 235 for sTRP operation and two SRS resource sets 235 for mTRP operation. To achieve such a dynamic switching between sTRP operation and mTRP operation for PUSCH transmissions, the base station 105-*a* may transmit a DCI message to the UE 115-*a* including a bit field for dynamic switching that indicates which SRS resource set 235 and corresponding set of power control parameters to use for different repetitions of the PUSCH transmission.

For example, the bit field for dynamic switching may have a size of two bits and may indicate one of four configurations for the PUSCH transmission (for example, for the two sets of repetitions of the PUSCH transmission). If the bit field for dynamic switching has a value '00', the UE 115-*a* may use the SRS resource set 235-*a* that is associated with the first set of power control parameters and the beam 230-*a* for the PUSCH transmission (for example, for each repetition of the PUSCH transmission). In such examples in which the UE 115-*a* uses the first set of power control parameters and the beam 230-*a* for the repetitions of the PUSCH transmission, the base station 105-*a* may receive the repetitions of the PUSCH transmission via one TRP 240 (such as the TRP 240-*a*). Alternatively, if the bit field for dynamic switching has a value '01', the UE 115-*a* may use the SRS resource set 235-*b* that is associated with the second set of control parameters and the beam 230-*b* for the PUSCH transmission (for example, for each repetition of the PUSCH transmission). In such examples in which the UE 115-*a* uses the second set of power control parameters and the beam 230-*b* for the repetitions of the PUSCH transmission, the base station 105-*a* may receive the repetitions of the PUSCH transmission via one TRP 240 (such as the TRP 240-*b*).

Alternatively, if the bit field for dynamic switching has a value '10', the UE 115-*a* may alternate between the SRS resource set 235-*a* and the SRS resource set 235-*b* for the repetitions of the PUSCH transmission in accordance with a first order pattern. For example, the UE 115-*a* may use the first set of power control parameters and the beam 230-*a* for a first one or more instances of the PUSCH transmission and may use the second set of power control parameters and the beam 230-*b* for a second one or more instances of the PUSCH transmission. In such examples, the base station 105-*a* may receive the first one or more instances of the repetitions of the PUSCH transmission via the TRP 240-*a* and may receive the second one or more instances of the repetitions of the PUSCH transmission via the TRP 240-*b*. Alternatively, if the bit field for dynamic switching has a value '11', the UE 115-*a* may alternate between the SRS resource set 235-*a* and the SRS resource set 235-*b* in accordance with a second order pattern. For example, the UE 115-*a* may use the second set of power control parameters and the beam 230-*b* for a first one or more instances of the PUSCH transmission and may use the first set of power control parameters and the beam 230-*a* for a second one or more instances of the PUSCH transmission. In such examples, the base station 105-*a* may receive the first one or more instances of the repetitions of the PUSCH transmission via the TRP 240-*b* and may receive the second one or more instances of the repetitions of the PUSCH transmission via the TRP 240-*a*. Such order patterns and transmission mapping is described in more detail with reference to FIG. 3.

To support an extension of PUSCH repetition with two beams 230 and two sets of power control parameters to CG uplink transmissions (for example, to CG-PUSCH transmissions), the base station 105-*a* may additionally configure the second set of power control parameters for the UE 115-*a* via RRC signaling. In other words, the base station 105-*a* may configure the UE 115-*a* with the first set of power control parameters for the beam 230-*a* (which may both be associated with the SRS resource set 235-*a*) and the second set of power control parameters for the beam 230-*b* (which may both be associated with the SRS resource set 235-*b*) via RRC signaling. For example, the base station 105-*a* may include a second pathlossReferenceIndex parameter, a second srs-ResourceIndicator parameter, and a second precodingAndNumberOfLayers parameter in the rrc-ConfiguredUplinkGrant parameter and may include a second p0-PUSCH-Alpha parameter and a second powerControlLoopToUse parameter in the ConfiguredGrantConfig parameter.

For a Type 1 CG, the base station 105 *a* may both configure and activate the SRS resource sets 235 for the CG uplink transmission from the UE 115 *a* via RRC signaling. For example, the CG configuration 205 may configure the UE 115 *a* with one or more SRS resource sets 235 and transmission parameters (for example, the sets of power control parameters) associated therewith, and the CG configuration 205 may also activate the use of such SRS resource sets 235 for the CG uplink transmission. In such examples, the base station 105 *a* may refrain from transmitting a DCI message activating the SRS resource sets 235

In some examples, the base station 105-*a* may provide information otherwise indicated in an SRI field (for example, within a DCI message) using one or more RRC parameters. For example, the base station 105-*a* may transmit an SRI, precoding information, or a rank, among other examples, using RRC parameters, such as an srs-ResourceIndicator parameter (for the SRI) and a precodingAndNumberOfLayers parameter (for the precoding information and the rank).

However, in some cases, the UE 115-*a* may have difficulty in determining which SRS resource set 235 to use if interpreting the RRC parameters. That is, it may be difficult to determine which SRS resource set 235 to use if applying CG uplink transmission related RRC parameters to one or more uplink transmissions. For example, in interpreting the srs-ResourceIndicator parameter, it may be ambiguous to the UE 115-*a* whether to use the first SRS resource set 235-*a* or the second SRS resource set 235-*b*. Similarly, for the precodingAndNumberOfLayers parameter, as the interpretation of such a parameter may depend on a quantity of SRS ports, and a selected SRS resource, such that the UE 115-*a* may have difficulty in determining the SRS resource set 235 to use.

In some examples, the UE 115-*a* may be configured to determine which SRS resource set 235 to use if interpreting CG configuration 205. For example, the base station 105-*a* may configure the UE 115-*a* with two SRS resource sets 235 (for example, for codebook and non-codebook PUSCH transmissions), in which in some examples, the base station 105-*a* may refrain from configuring the second fields in RRC signaling. For example, the base station 105-*a* may use an sTRP configuration, or any other configuration such that the base station 105-*a* may refrain from configuring the UE 115-*a* with the second srs-ResourceIndicator field and the second precodingAndNumberOfLayers field within the rrc-ConfiguredUplinkGrant field. In such an example, the UE 115-*a* may associate the first srs-ResourceIndicator field and the first precodingAndNumberOfLayers field with the first SRS resource set 235-*a*. In such examples, the first SRS resource set 235-*a* may be the SRS resource set 235 with a lower SRS resource set ID. Additionally or alternatively, the base station 105-*a* may include a field within the rrc-ConfiguredUplinkGrant field that may indicate which SRS resource set 235 may be associated with the first srs-ResourceIndicator field and the first precodingAndNumberOfLayers field. In other words, the base station 105-*a* may include an additional field within RRC signaling, indicating to the UE 115-*a* whether to use the first SRS resource set 235-*a* or the second SRS resource set 235-*b* if interpreting the RRC signaling (for example, the first srs-ResourceIndicator field and the first precodingAndNumberOfLayers field). In another example, the base station 105-*a* may configure the UE 115-*a* with two SRS resource sets 235 (for example, for codebook and non-codebook PUSCH transmissions), in which in some examples, the base station 105-*a* may configure the second fields in RRC signaling. For example, the base station 105-*a* may use an mTRP configuration, or any other configuration such that the base station 105-*a* may configure the UE 115-*a* with the second srs-ResourceIndicator field and the second precodingAndNumberOfLayers field within the rrc-ConfiguredUplinkGrant field. In such an example, the UE 115-*a* may determine that the first SRS resource set 235-*a* corresponds to the first srs-ResourceIndicator field and the first precodingAndNumberOfLayers field and that the second SRS resource set 235-*b* corresponds to the second srs-ResourceIndicator field and the second precodingAndNumberOfLayers field.

In cases in which the UE 115-*a* may be configured with both the first srs-ResourceIndicator and precodingAndNumberOfLayers parameters and the second srs-ResourceIndicator and precodingAndNumberOfLayers parameters, the UE 115-*a* may be configured to use a specific mapping between uplink transmissions and SRS resource sets 235 if transmitting uplink repetitions to the base station 105-*a*. For example, the UE 115-*a* may be configured according to a fixed order of uplink repetitions. That is, the UE 115-*a* may transmit a first uplink repetition using the first SRS resource set 235-*a* and may transmit the remaining uplink repetitions in accordance with an RRC configured mapping type, for example, a cyclic mapping (for example, 1212), a sequential mapping (for example, 1122), or any other mapping type. In another example, the UE 115-*a* may receive an RRC configuration (for example, in rrc-ConfiguredUplinkGrant) that may indicate the SRS resource set 235 order associated with transmitting uplink repetitions. For example, the base station 105-*a* may transmit an additional RRC configuration (for example, an additional field) indicating whether the first uplink repetition in time may be associated with the first SRS resource set 235-*a* or the second SRS resource set 235-*b*. In yet another example, the UE 115-*a* may receive an RRC message indicating one of four possible mapping configurations (for example, dynamic switching possibilities as described with reference to FIG. 3B). That is, the base station 105-*a* may transmit an additional RRC configuration to the UE 115-*a* indicating one of four mapping configurations.

Configuring UEs 115 with the techniques may enable such UEs 115 to determine which SRS resource set 235 to use if interpreting CG uplink transmission associated RRC parameters. Enabling devices to determine which SRS resource set 235 to use if interpreting RRC parameters may enhance synchronization between communicating devices, reduce system latency, and decrease power consumption.

Figure 3A:
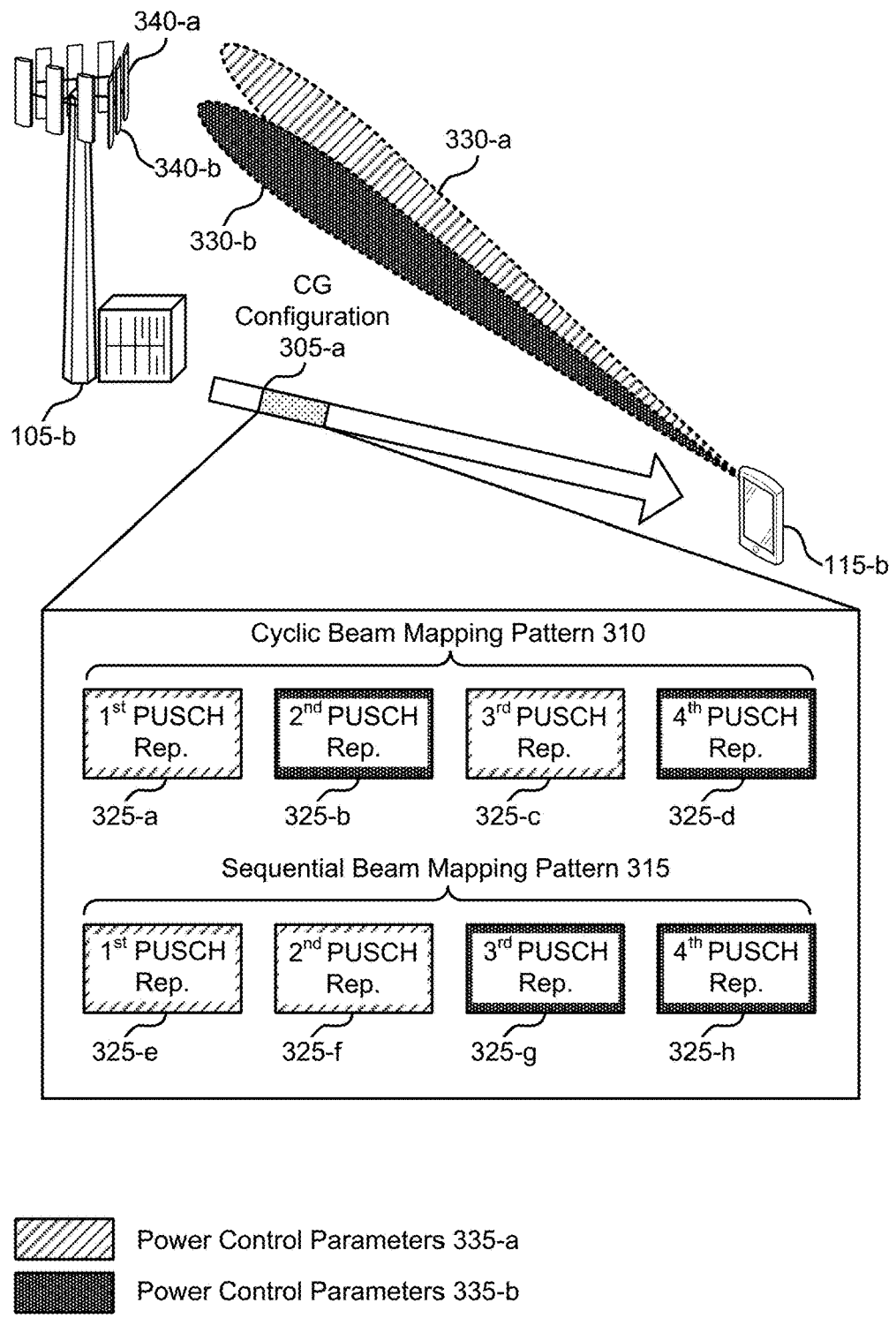

FIG. 3A illustrates an example of a wireless communications system 300 that supports SRI association for CG-based TRP PUSCH transmission in accordance with aspects of the present disclosure. The wireless communications system 300 may implement or be implemented to realize aspects of the wireless communications system 100 and the wireless communications system 200. For example, the wireless communications system 300 may illustrate communications between a UE 115-*b* and a base station 105-*b*, which may be examples of corresponding devices, including with reference to FIGS. 1 and 2. The base station 105-*b* may configure the UE 115-*b* with a CG configuration 305-*a* for multiple CG uplink transmissions 325 using multiple beams 330 with corresponding power control parameters 335 that transmit the uplink data to multiple TRPs 340 at the base station 105-*b*. In some examples, the CG configuration 305-*a*, which may be an example of the CG configuration 205 as described with reference to FIG. 2, may indicate one or more SRS resource set configurations for the UE 115-*b* to use. As such, the UE 115-*b* may follow techniques to determine which SRS resource set to use if transmitting respective CG uplink transmissions 325.

In the example of wireless communications system 300, the UE 115-*b* may transmit repetitions, such as four repetitions, of the CG uplink transmissions 325 and may alternate between transmitting the CG uplink transmissions 325 to the TRP 340-*a* using a first SRS resource set corresponding to the first set of control parameters 335-*a* and the first beam 330-*a* and transmitting the CG uplink transmissions 325 to the TRP 340-*b* using a second SRS resource set corresponding to the second set of control parameters 335-*b* and the second beam 330-*b*.

In some examples, the CG configuration 305-*a* message may also indicate a beam mapping pattern for the CG uplink transmissions 325, such as a cyclic beam mapping pattern 310 or a sequential beam mapping pattern 315, and the UE 115-*b* may transmit the CG uplink transmissions in accordance with the beam mapping pattern. In such examples, the UE 115-*b* may receive the beam mapping via RRC signaling. In examples in which the CG configuration 305-*a* indicates the cyclic beam mapping pattern 310, the UE 115-*b* may alternate between the first SRS resource set and the second SRS resource set. In other words, the UE 115-*b* may alternate between the first SRS resource set and the second SRS resource set after each CG uplink transmission 325 occasion. For example, the UE 115-*b* may transmit the CG uplink transmission 325-*a* and the CG uplink transmission 325-*c* to the TRP 340-*a* using the first SRS resource set and may transmit the CG uplink transmission 325-*b* and the CG uplink transmission 325-*d* to the TRP 340-*b* using the second SRS resource set.

In examples in which the CG configuration 305-*a* indicates the sequential beam mapping pattern 315, the UE 115-*b* may sequentially transmit some first quantity, such as a first half, of CG uplink transmissions 325 using the first SRS resource set and may switch to transmit some second quantity, such as a second half, of the CG uplink transmissions 325 using the second SRS resource set. In some implementations, the first quantity may be the same as the second quantity (for example, each may be a half of the CG uplink transmissions 325 and a quantity of repetitions of for the CG uplink transmissions 325 may be an even quantity). In some other implementations, the first quantity may be different than the second quantity (for example, the first quantity may be a greater quantity or a lesser quantity of the CG uplink transmissions 325 compared to the second quantity). For example, the UE 115-*b* may transmit the CG uplink transmission 325-*e* and the CG uplink transmission 325-*f* to the TRP 340-*a* using the first SRS resource set and may transmit the CG uplink transmission 325-*g* and the CG uplink transmission 325-*h* to the TRP 340-*b* using the second SRS resource set.

In some cases, the UE 115-*b* may have difficulty in determining which SRS resource set to use if interpreting RRC parameters included in the CG configuration 305-*a*. For example, in interpreting a parameter, such as the srs-ResourceIndicator parameter, it may be ambiguous to the UE 115-*b* whether to use the first SRS resource set or the second SRS resource set. Similarly, for another parameter, such as the precodingAndNumberOfLayers parameter, the interpretation of such a parameter may depend on a quantity of SRS ports, and a selected SRS resource such that the UE 115-*b* may have difficulty in determining the SRS resource set to use. Further, the difficulty may be increased in cases in which the base station 105-*b* configures the UE 115-*b* with other parameters, such as a second srs-ResourceIndicator parameter and a second precodingAndNumberOfLayers parameter (for example, in cases in which the base station 105-*b* uses an mTRP configuration).

In some examples, the UE 115-*b* may use the techniques described herein to determine which SRS resource set to use if interpreting the CG configuration 305-*a* as well as the appropriate mapping pattern in accordance with the CG configuration 305-*a*. For example, the base station 105-*b* may configure the UE 115-*b* with first parameters, such as a first srs-ResourceIndicator parameter and a first precodingAndNumberOfLayers parameter, while refraining from configuring the UE 115-*b* with second parameters, such as a second srs-ResourceIndicator parameter and a second precodingAndNumberOfLayers parameter. In such examples, the UE 115-*b* may associate the first SRS resource set (for example, the SRS resource set with the lowest SRS resource set ID) with the first srs-ResourceIndicator parameter and the first precodingAndNumberOfLayers parameter and may interpret such parameters therewith. In other examples, the base station 105-*b* may add an indication, such as adding a field, within the RRC signaling, indicating which SRS resource set to associate with one or more parameters, such as the first srs-ResourceIndicator parameter and the first precodingAndNumberOfLayers parameter. That is, the base station 105-*b* may transmit an RRC indication (for example, with other RRC signaling) or an additional RRC configuration (for example, within the rrc-ConfiguredUplinkGrant field of CG configuration 305-*a*), indicating (for example, pointing to) the first SRS resource set or the second SRS resource set (for example, the SRS resource set with the higher SRS resource set ID) that the UE 115-*b* may use if interpreting one or more parameters, such as the first srs-ResourceIndicator parameter and the first precodingAndNumberOfLayers parameter. Additionally, in various examples, the UE 115-*b* may transmit CG uplink transmissions 325 with a cyclic beam mapping pattern 310, a sequential beam mapping pattern 315, or any other mapping pattern defined at the UE 115-*b* (for example, preconfigured at the UE 115-*b*) or signaled by the base station 105-*b*, or any combination thereof.

In some examples, the base station 105-*b* may configure the UE 115-*b* with multiple parameters, such as a first srs-ResourceIndicator parameter, a first precodingAndNumberOfLayers parameter, a second srs-ResourceIndicator parameter, and a second precodingAndNumberOfLayers parameter. In such examples, the UE 115-*b* may associate the first SRS resource set (for example, a resource set with the relatively lower SRS resource set ID) with one or more parameters, such as the first srs-ResourceIndicator parameter and the first precodingAndNumberOfLayers parameter and may associate the second SRS resource set (for example, with the higher SRS resource set ID) with one or more parameters, such as the second srs-ResourceIndicator parameter and the second precodingAndNumberOfLayers parameter. In some examples, the UE 115-*b* may be configured with a fixed order of repetitions. For example, the UE 115-*b* may transmit the first CG uplink transmission 325 using the first SRS resource set and the UE 115-*b* may transmit the remaining (for example, three) CG uplink transmissions in accordance with a fixed beam mapping type such as the cyclic beam mapping pattern 310 or the sequential beam mapping pattern 315. Additionally or alternatively, the base station 105-*b* may add an additional RRC configuration to the CG configuration 305-*a*, indicating a particular order of PUSCH repetitions. In other words, the base station 105-*b* may transmit the CG configuration 305-*a* with an additional field (for example, within rrc-ConfiguredUplinkGrant) indicating which SRS resource set that a first PUSCH repetition may correspond to. For example, the base station 105-*b* may indicate that the UE 115-*b* may transmit the first CG uplink transmission 325 using the second SRS resource set. The UE 115-*b* may then transmit the remaining CG uplink transmissions 325 in accordance with a cyclic beam mapping pattern 310, a sequential beam mapping pattern 315, or any other mapping pattern.

Figure 3B:
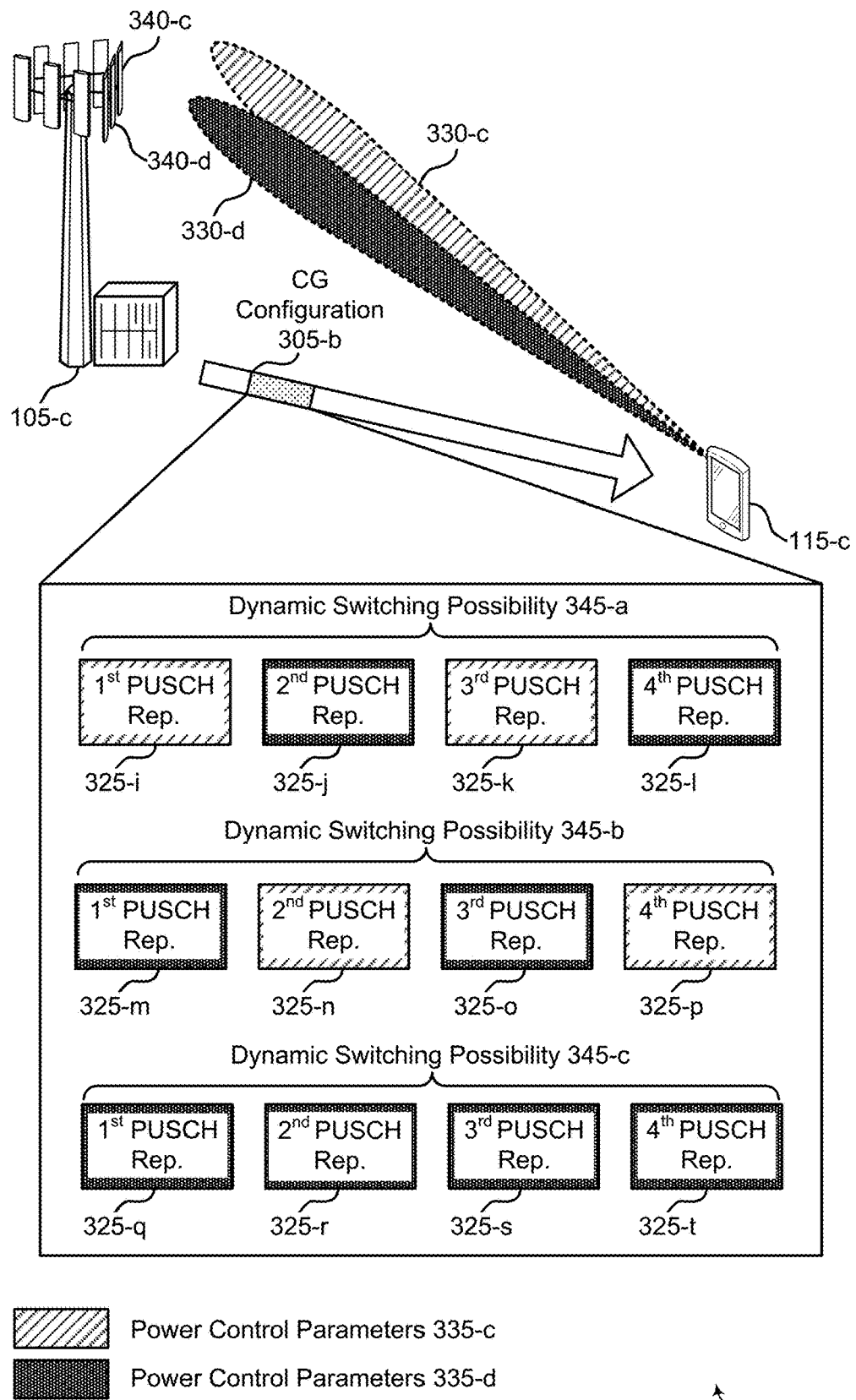

FIG. 3B illustrates an example of a wireless communications system 301 that supports SRI association for CG-based TRP PUSCH transmission in accordance with aspects of the present disclosure. The wireless communications system 301 may implement or be implemented to realize aspects of the wireless communications system 100, the wireless communications system 200, or the wireless communications system 300. For example, the wireless communications system 301 may illustrate communications between a UE 115-*c* and a base station 105-*c*, which may be examples of corresponding devices, including with reference to FIGS. 1, 2, and 3A. The base station 105-*c* may configure the UE 115-*c* with a CG configuration 305-*c* for multiple CG uplink transmissions 325 using multiple beams 330 with corresponding power control parameters 335 that transmit the uplink data to multiple TRPs 340 at the base station 105-*c*. In some examples, the CG configuration 305-*b*, which may be an example of the CG configuration 305-*a* as described with reference to FIG. 3A, may indicate one or more SRS resource set configurations for the UE 115-*c* to use. As such, the UE 115-*c* may follow techniques to determine which SRS resource set to use if transmitting respective CG uplink transmissions 325.

In the example of wireless communications system 301, the UE 115-*c* may transmit repetitions, such as four repetitions, of the CG uplink transmissions 325 and may alternate between transmitting the CG uplink transmissions 325 to the TRP 340-*c* using a first SRS resource set corresponding to the first set of control parameters 335-*c* and the first beam 330-*c* and transmitting the CG uplink transmissions 325 to the TRP 340-*d* using a second SRS resource set corresponding to the second set of control parameters 335-*d* and the second beam 330-*d*.

In some examples, the base station 105-*c* may configure the UE 115-*c* with a limited quantity, for example four, dynamic switching possibilities 345 which the UE 115-*c* may use to determine which SRS resource set to use when transmitting each CG uplink transmission 325. To inform the UE 115-*c* of such dynamic switching possibilities 345, the base station 105-*c* may transmit the CG configuration 305-*b* with an additional field (for example, within rrc-ConfiguredUplinkGrant) indicating one of the potential, limited quantity dynamic switching possibilities 345 (for example, one of the four dynamic switching possibilities 345).

For example, the UE 115-*c* may be configured with four dynamic switching possibilities 345, in which each dynamic switching possibility 345 may be associated with a respective transmission pattern instructing the UE 115-*c* to transmit one or more CG uplink transmissions 325 to one or more TRPs 340 (for example, using SRS resource sets associated with the power control parameters 335) in a sequence. In some examples, the base station 105-*c* may indicate one of the four potential dynamic switching possibilities 345 with a field, such as a two-bit field. That is, the base station 105-*c* may transmit two bits, corresponding to one of the four potential dynamic switching possibilities 345, within the additional field. Each dynamic switching possibility 345 may correspond to a particular transmission pattern. For example, the base station 105-*c* may transmit the CG configuration 305-*b* with the additional field having a value of "10," which may indicate that the UE 115-*c* may use dynamic switching possibility 345-*a*. As such, the UE 115-*c* may use the power control parameters 335-*c* for CG uplink transmission 325-*i* and CG uplink transmission 325-*k* and may transmit the CG uplink transmission 325-*i* and the CG uplink transmission 325-*k* towards the TRP 340-*c*. In such aspects, the UE 115-*c* may use the power control parameters 335-*d* for CG uplink transmission 325-*j* and CG uplink transmission 325-1 and may transmit the CG uplink transmission 325-*j* and the CG uplink transmission 325-1 toward the TRP 340-*d*. In some examples, the base station 105-*c* may transmit the CG configuration 305-*d* with the additional field having a value of "11," which may indicate that the UE 115-*c* may use dynamic switching possibility 345-*b*. As such, the UE 115-*c* may use the power control parameters 335-*d* for a CG uplink transmission 325-*m* and CG uplink transmission 325-*o* and may transmit the CG uplink transmission 325-*m* and the CG uplink transmission 325-*o* towards the TRP 340-*d*. In such examples, the UE 115-*c* may use the power control parameters 335-*c* for CG uplink transmission 325-*n* and CG uplink transmission 325-*p* and may transmit the CG uplink transmission 325-*n* and the CG uplink transmission 325-*p* towards the TRP 340-*c*. In some implementations, the base station 105-*c* may transmit the CG configuration 305-*b* with the additional field having a value of "01," which may indicate that the UE 115-*c* may use the dynamic switching possibility 345-*c*. As such, the UE 115-*c* may use power control parameters 335-*d* to transmit the CG uplink transmission 325-*q*, CG uplink transmission 325-*r*, CG uplink transmission 325-*s*, and CG uplink transmission 325-*t* toward the TRP 340-*b*. In other words, the UE 115-*c* may transmit CG uplink transmissions toward the TRP 340-*b* using only the power control parameters 335-*d* and the associated SRS resource set. In some examples, the base station 105-*c* may transmit the CG configuration 305-*b* with the additional field having a value of "00," which may indicate that the UE 115-*c* may use the power control parameters 335-*c* and may transmit CG uplink transmissions 325 toward the TRP 340-*a*.

It may be understood that the any CG configuration 305 may include any pattern mapping SRS resource sets to respective CG uplink transmissions 325. Further, UEs 115 may be configured with any quantity of CG uplink transmissions 325, dynamic switching possibilities 345 may correspond to any SRS resource set mapping order, dynamic switching possibilities 345 may be associated with any quantity of TRPs 340, and the additional field may include any quantity of bits.

Figure 4:
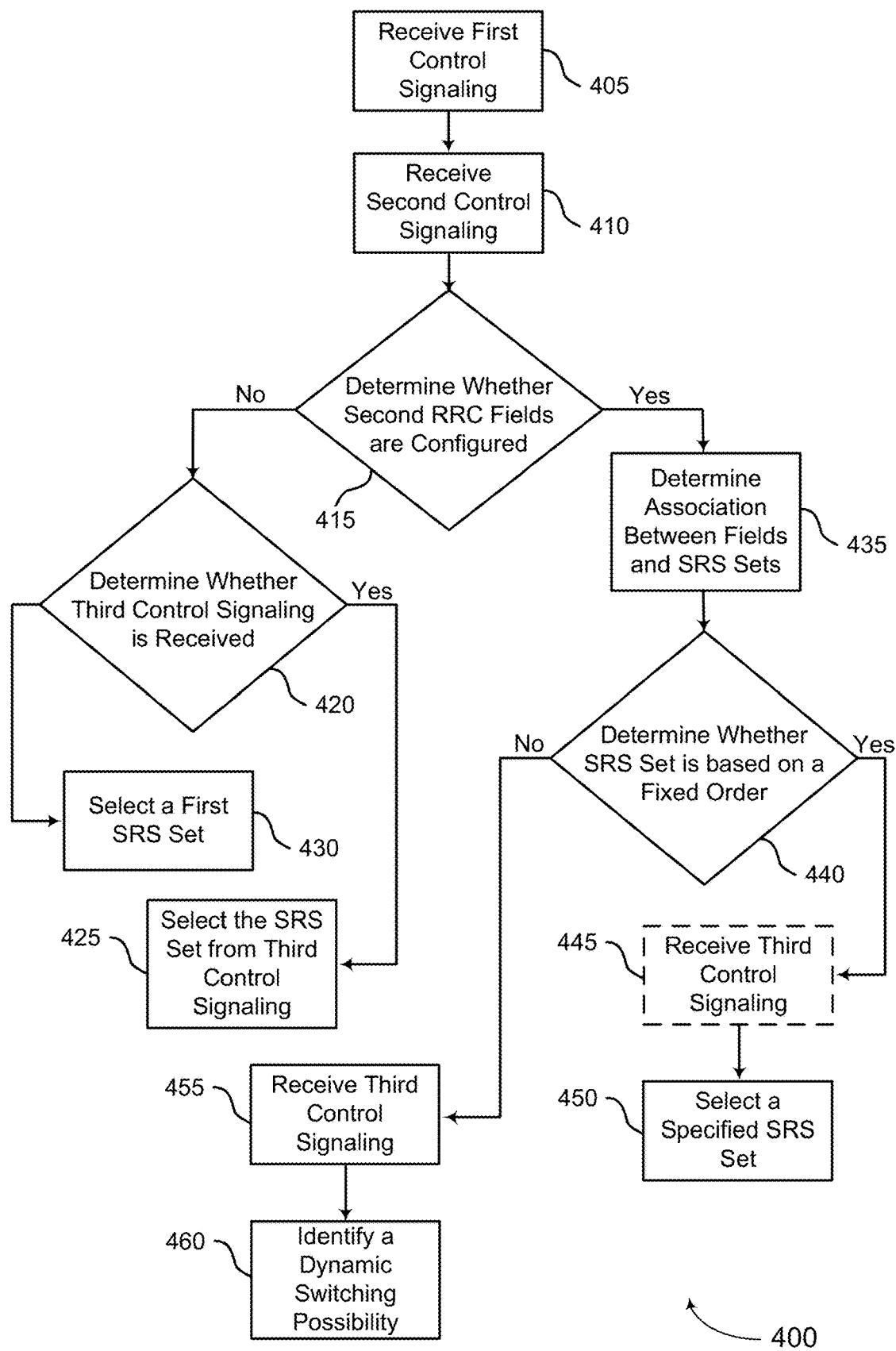
FIG. 4 illustrates an example of a process flow that supports SRI association for CG-based TRP PUSCH transmission in accordance with aspects of the present disclosure.

FIG. 4 illustrates an example of a process flow 400 that supports SRI association for CG-based TRP PUSCH transmission in accordance with aspects of the present disclosure. The operations of the process flow 400 may be implemented by a wireless device, such as a UE, among other options. For example, the operations of the process flow 400 may be performed by a UE as described with reference to FIGS. 1-3B. In some examples, a UE may be configured to use multiple SRS resource sets if communicating with other devices. As such, the UE may use, or otherwise reference, process flow 400 in determining which SRS resource set to use if interpreting RRC configurations, determining an uplink transmission mapping (for example, CG uplink transmissions), among other examples. Alternative examples of the following may be implemented, in which some steps are performed in a different order or not at all. Additionally, some steps may include additional features not mentioned below.

At 405, the UE may receive first control signaling. In some examples, the first control signaling may indicate a first SRS resource set associated with a first set of power control parameters and a second SRS resource set associated with a second set of power control parameters. In some examples, the first control signaling may be RRC signaling from a base station. In such examples, the first control signaling may indicate an association of the first SRS resource set with a first TRP and the second SRS resource set with a second TRP.

At 410, the UE may receive second control signaling. In some examples, the second control signaling may indicate a CG configuration that the UE may use, or reference, if transmitting uplink information (for example, CG uplink transmissions). The first set of power control parameters and the second set of power control parameters may be associated with transmissions corresponding to the CG configuration. In some examples, the CG configuration may include an indication of a fixed mapping pattern, a mapping pattern order, or another configured mapping pattern (for example, a mapping pattern of four possible mapping patterns), or any combination thereof, as described with reference to FIGS. 2 and 3. In some examples, the second control signaling may be RRC signaling such as the RRC signaling including the first control signaling. In some examples, the second control signaling may be RRC signaling such as RRC signaling that is separate from the RRC including the first control signaling.

At 415, the UE may determine a configuration status of at least some of, if not each of, one or more fields in RRC signaling such as the first control signaling or the second control signaling. In particular, the UE may determine whether second RRC fields are configured within configuration signaling from the base station. For example, the UE may determine whether RRC fields, such as a second srs-ResourceIndicator field and a second precoderAndNumberOfLayers field, are configured in control signaling as described with reference to FIGS. 2 and 3.

In some examples, the UE may determine that such second RRC fields are not configured within configuration signaling from the base station. As such, at 420, the UE may determine whether third control signaling is received. In some examples, the third control signaling may (for example, explicitly) indicate whether the UE should use the first SRS resource set or the second SRS resource set if interpreting RRC fields, such as a first srs-ResourceIndicator field and a first precoderAndNumberOfLayers field. In such examples, the UE may receive the third control signaling, at 425, and may use the indicated SRS resource set if interpreting the first fields (for example, the first srs-ResourceIndicator field and the first precoderAndNumberOfLayers field). In some examples, the first control signaling, the second control signaling, or both may include the third control signaling. For example, the third signaling may be communicated as part of one or both of the first control signaling or the second control signaling. In some examples, the first control signaling, the second control signaling, or both may not include the third control signaling. For example, the third signaling may be communicated separate from both of the first control signaling and the second control signaling. Alternatively, the UE may fail to receive the third control signaling. As such, at 430, the UE may select the first SRS resource set (for example, the SRS resource set associated with the lower or lowest SRS resource set ID) if interpreting the first RRC fields. For example, the UE may be configured to use a particular SRS resource set, such as the SRS resource set with the lowest SRS resource set ID, when interpreting the first fields if the UE determines the second fields are not configured within the configuration signaling from the base station.

In some examples, the UE may determine that the second RRC fields are configured within configuration signaling from the base station. As such, at 435, the UE may determine an association between RRC fields and SRS resource sets. In some examples, the UE may be configured to associate particular SRS resource sets with particular RRC fields. For example, the UE may determine that the first RRC fields, such as the first srs-ResourceIndicator field and the first precoderAndNumberOfLayers field, are associated with the first SRS resource set (for example, with the lower SRS resource set ID) and that the second RRC fields, such as the second srs-ResourceIndicator field and the second precoderAndNumberOfLayers field are associated with the second SRS resource set (for example, with the higher SRS resource set ID). In other examples, the UE may determine that the first RRC fields are associated with the SRS resource set with the higher SRS resource set ID and that the second RRC fields are associated with the SRS resource set with the lower SRS resource set ID.

At 440, the UE may determine whether the CG configuration and the SRS resource sets are associated with a mapping order, such as a fixed uplink transmission mapping order. That is, the UE may be configured to select an SRS resource set for one or more transmissions (for example, CG uplink transmissions), in which selecting the SRS resource set may be based on a fixed order for the one or more transmissions. For example, the UE may be configured with a fixed mapping pattern, such as a cyclic mapping pattern, a sequential mapping pattern, or any other mapping pattern, such that the UE may select the first SRS resource set for a first set of transmissions and the second SRS resource set for a second set of transmissions. In some examples, the base station may configure the UE with the fixed order (for example, through RRC signaling) or the UE may be preconfigured with the fixed order.

In some examples, the UE may determine that the CG configuration and the SRS resource sets are associated with a fixed uplink transmission mapping order. In such examples, at 450, the UE may select the first SRS resource set for a first transmission. For example, if selecting the SRS resource set based on the fixed order for the one or more transmissions, the UE may select the first SRS resource set for a first transmission in time of the one or more transmissions. The UE may select the first SRS resource set or the second SRS resource set for one or more second (for example, remaining) transmissions in time of the one or more transmissions in accordance with a mapping type. In some examples, the mapping type may be a cyclic mapping (for example, a cyclic beam mapping pattern) of the first SRS resource set and the second SRS resource set. In other examples, the mapping type may be a sequential mapping (for example, a sequential beam mapping pattern) of the first SRS resource set and the second SRS resource set. However, in some examples, at 445 and prior to selecting the first SRS resource set for the first transmission, the UE may receive third control signaling. In some examples, the third control signaling may have a field indicating that the first transmission in time may be associated with either the first SRS resource set or the second SRS resource set such that the UE may determine which SRS resource set to use for the first transmission in accordance with the third control signaling. As such, transmitting the one or more transmissions and the transmission mapping of the SRS resource sets may be based on the third control signaling. For example, the third control signaling may indicate to the UE to use the second SRS resource set if transmitting the first transmission. In this example, the UE may be configured to use a cyclic mapping, in which the UE may transmit the second transmission using the first SRS resource set, the third transmission using the second SRS resource set, and so on.

In some examples, the UE may determine that the CG configuration and the SRS resource sets are not associated with a fixed uplink transmission mapping order (for example, the CG configuration or the SRS resource sets or both are associated with a different uplink transmission mapping order or no uplink transmission mapping order). In such examples, at 455, the UE may receive a third control signaling from the base station. In some examples, the third control signaling may have an indication, such as a field indicating, one of a fixed set of preconfigured mapping options associated with one or both of the first SRS resource set or the second SRS resource set. In some examples, the fixed set of preconfigured mapping options may include one or more of a first transmission in time of the one or more transmissions associated with the first SRS resource set and a second transmission in time of the one or more transmissions associated with the second SRS set. That is, a first transmission may correspond to the first SRS resource set and a second transmission may correspond to the second SRS resource set. In some examples, the fixed set of preconfigured mapping options may include a first transmission in time of the one or more transmissions associated with the second SRS resource set and a second transmission in time of the one or more transmissions associated with the first SRS resource set. That is, a first transmission may correspond to the second SRS resource set and a second transmission may correspond to the first SRS resource set. In some examples, the fixed set of preconfigured mapping options may include the one or more transmissions being associated with the first SRS set or the one or more transmissions being associated with the second SRS resource set. Such mapping options may be mapped to one or more representations, such as one or more binary representations. For example, the fixed set of preconfigured mapping options may include four mapping options, in which each mapping option may correspond to a respective binary representation (for example, a two-bit representation such as 00, 01, 10, or 11). The preconfigured mapping options may be examples of the dynamic switching possibilities as described with reference to FIG. 3B. In such an example, the base station 105-*b* may include the binary representation associated with a mapping option within the respective field in the third control signaling such that the UE may determine the dynamic switching possibility at 460.

Figure 5:
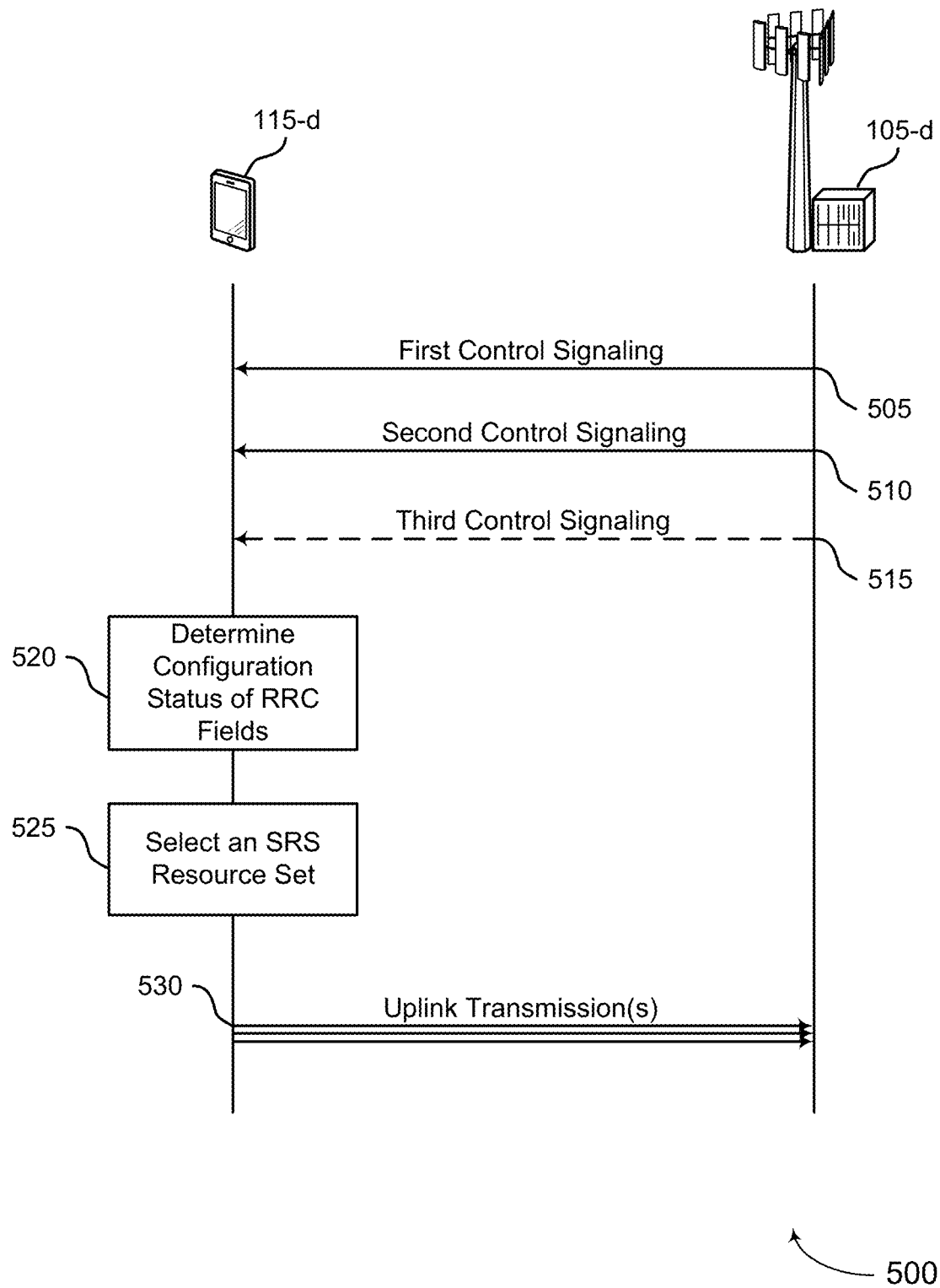
FIG. 5 illustrates an example of a process flow that supports SRI association for CG-based TRP PUSCH transmission in accordance with aspects of the present disclosure.

FIG. 5 illustrates an example of a process flow 500 that supports SRI association for CG-based TRP PUSCH transmission in accordance with aspects of the present disclosure. In some examples, the process flow 500 may implement aspects of wireless communications systems 100, 200, or 300, as described with reference to FIGS. 1-3B, respectively. For example, UE 115-*d* and base station 105-*d*—which may be examples of the corresponding devices described with reference to FIGS. 1, 2, 3A, and 3B—may communicate using one or more communication links in which the base station 105-*d* may transmit control information, configuring one or more uplink transmissions from the UE 115-*d*. In some examples, the UE 115-*d* may be configured to use multiple SRS resource sets if interpreting such control information and the UE 115-*d* may experience difficulty in determining which SRS resource set to use if interpreting specific control parameters. The UE 115-*d* may be configured to determine which SRS resource set to use if interpreting control information from the base station 105-*c*. For example, the UE 115-*d* may be configured to use, or otherwise reference, process flow 400 if determining which SRS resource set to use.

At 505, the base station 105-*d* may transmit, and the UE 115-*d* may receive, first control signaling including an indication of a first SRS resource set and a second SRS resource set associated with a first set of power control parameters and a second set of power control parameters, respectively. The base station 105-*d* may transmit the first control signaling as, or within, RRC signaling.

At 510, the base station 105-*d* may transmit, and the UE 115-*d* may receive, second control signaling including an indication of a CG configuration, such as CG configuration 205 or CG configuration 305 as described with reference to FIGS. 2, 3A, and 3B, respectively. In such examples, the first set of power control parameters and the second set of power control parameters may be for transmissions configured by the CG configuration. In some examples, receiving the second control signaling indicating the CG configuration may include receiving second control signaling indicating a CG PUSCH configuration. Additionally or alternatively, the CG configuration includes a Type 1 CG PUSCH configuration. In some examples, the base station 105-*d* may transmit the second control signaling as, or within RRC signaling and, in some examples, the base station 105-*d* may transmit the second control signaling in the same RRC signaling as the first control signaling. The one or more fields in the RRC signaling includes one or more of an SRS resource indicator field (for example, srs-ResourceIndicator), a precoding and number of layers field (for example, precodingAndNumberOfLayers), or a pathloss reference index field (for example, pathlossReferenceIndex).

In some examples, at 415, the base station 105-d may transmit, and the UE 115-d may receive, third control signaling which may indicate which fields are associated with which SRS resource sets, or one or more mapping options, among other examples. The third control signaling may aid the UE 115-d in determining which SRS resource set to use if interpreting control signaling from the base station 105-d, for example, such as the third control signaling in the process flow 400 as described with reference to FIG. 4.

At 520, the UE 115-d may determine a configuration status for each of the one or more fields in the RRC signaling from the base station 105-d, based on receiving the first control signaling at 505, receiving the second control signaling at 510, or a combination thereof. For example, the UE 115-d may determine whether one or more second fields (for example, a second srs-ResourceIndicator and a second precodingAndNumberOfLayers) are configured in the RRC signaling. In some examples, the UE 115-d may determine that the second fields are not configured in the RRC signaling, for example, in accordance with the base station 105-d using an sTRP configuration. As such, the UE 115-d may determine to use the first SRS resource set if interpreting the one or more first fields (for example, a first srs-ResourceIndicator and a first precodingAndNumberOfLayers). Additionally or alternatively, the UE 115-d may receive third control signaling at 415, indicating which SRS resource set to use if interpreting the one or more first fields. In other examples, the UE 115-d may determine that the second fields are configured in the RRC signaling, for example, in accordance with the base station 105-d using an mTRP configuration. As such, the UE 115-d may associate the first SRS resource set with the first fields and may associate the second SRS resource set with the second fields.

At 525, the UE 115-d may select an SRS resource set from the first SRS resource set or the second SRS resource set based on the configuration status of each of the one or more fields in the RRC signaling, for example, determined at 520. In some examples, the UE 115-d may select the SRS resource set based on whether the second fields in the RRC signaling are configured. For example, in cases in which the UE 115-d determines that the second fields are not configured, the UE 115-d may determine to use the first SRS resource set if interpreting the first fields. Additionally or alternatively, the UE 115-d may use SRS resource set as indicated in the third control signaling at 515 if interpreting the first fields. In another example, the UE 115-d may determine that the second fields are configured. In such an example, the UE 115-d may select the SRS resource set based on a fixed order for the one or more uplink transmissions scheduled by the CG configuration. In some examples, the UE 115-d may determine a fixed order of the one or more uplink transmissions, in which each uplink transmission may be transmitted using a respective SRS resource set. For example, the UE 115-d may be configured to use a cyclic mapping pattern if transmitting the one or more uplink transmissions, in which the UE 115-d may select the SRS resource set based on the fixed order specified in the cyclic mapping pattern. The UE 115-d may be configured to select the first SRS resource set if transmitting the one or more uplink transmissions. Additionally or alternatively, the base station 105-d may include a field within the third control signaling at 415, indicating that the first transmission in time of the one or more uplink transmissions may be associated with the first SRS resource set or the second SRS resource set, in which the UE 115-d may select the SRS resource set based on the field in the third control signaling. In some examples, the UE 115-d may select the SRS resource set based on an indication of one of a fixed set of preconfigured mapping options. For example, the base station 105-d may include a field indicating one of a fixed set of preconfigured mapping options associated with one or both of the first SRS resource set or the second SRS resource set. The UE 115-d may then select the indicated mapping option and a respective SRS resource set based thereon. Selection of mapping options and SRS resource sets is described in more detail with reference to FIG. 4.

At 530, the UE 115-d may transmit one or more uplink transmissions to the base station 105-d in an order corresponding to the determined mapping pattern and in accordance with the selected SRS resource set. For example, the UE 115-d may transmit four CG uplink PUSCH repetitions in accordance with a mapping pattern fixed at the UE 115-d, or indicated by the base station 105-d, and starting with an SRS resource set as selected at 525.

Configuring UEs 115 to use techniques as described with reference to process flow 500 may mitigate difficulty in interpreting RRC parameters, for example, if the UEs 115 are configured to use multiple SRS resource sets. That is, UEs 115 configured according to the techniques described herein may determine an SRS resource set to use if interpreting one or more fields (for example, first and second srs-ResourceIndicator and precoderAndNumberOfLayers) as well as a mapping pattern to use if transmitting uplink transmissions. Such techniques may provide for expedited decision at the UE 115-d, enhanced synchronization between communicating devices, decreased system latency, among other examples.

Figure 6:
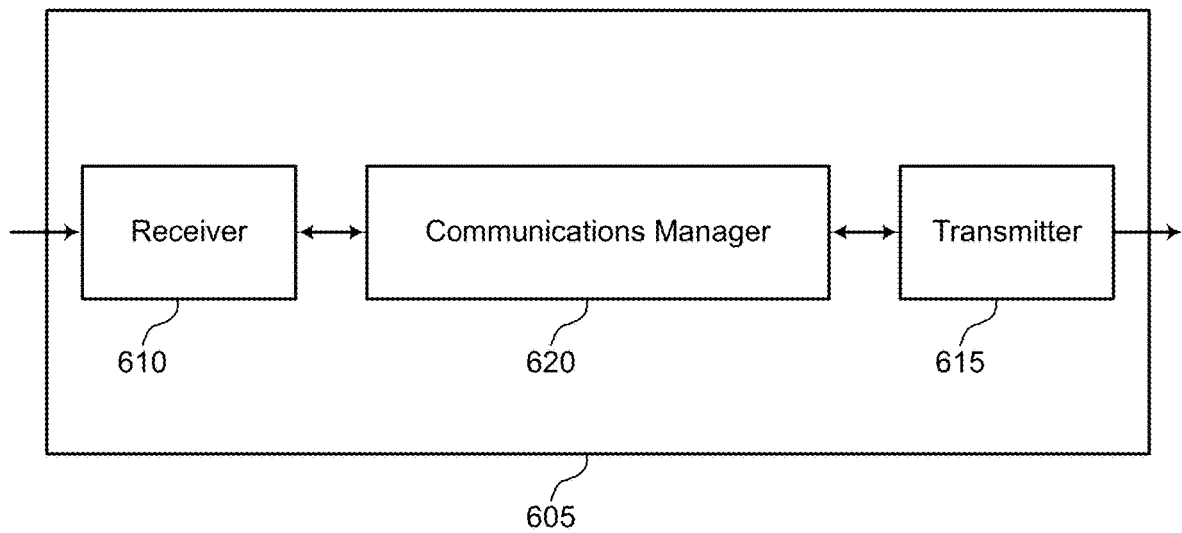
FIGS. 6 and 7 show block diagrams of devices that support SRI association for CG-based TRP PUSCH transmission in accordance with aspects of the present disclosure.

FIG. 6 shows a block diagram of a device 605 that supports SRI association for CG-based TRP PUSCH transmission in accordance with aspects of the present disclosure. The device 605 may be an example of aspects of a UE 115. The device 605 may include a receiver 610, a transmitter 615, and a communications manager 620. The communications manager 620 can be implemented, at least in part, by one or both of a modem and a processor may also include a processor. Each of these components may be in communication with one another (for example, via one or more buses).

The receiver 610 may provide a means for receiving information such as packets, user data, control information, or any combination thereof associated with various information channels (for example, control channels, data channels, information channels related to SRI association for CG-based TRP PUSCH repetition). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to SRI association for CG-based TRP PUSCH repetition). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of SRI association for CG-based TRP PUSCH repetition. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 620, the receiver 610, the transmitter 615, or various combinations or components thereof may be implemented in code (for example, as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (for example, configured as or otherwise supporting a means for performing the functions described in the present disclosure).

In some examples, the communications manager 620 may be configured to perform various operations (for example, receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations.

The communications manager 620 may support wireless communication at a UE in accordance with examples as disclosed herein. For example, the communications manager 620 may be configured as or otherwise support a means for receiving first control signaling indicating a first sounding reference signal resource set associated with a first set of power control parameters and a second sounding reference signal resource set associated with a second set of power control parameters. The communications manager 620 may be configured as or otherwise support a means for receiving second control signaling indicating a CG configuration, the first set of power control parameters and the second set of power control parameters being for uplink transmissions and associated with the CG configuration. The communications manager 620 may be configured as or otherwise support a means for determining a configuration status of each of one or more fields in RRC signaling based on one or both of the first control signaling or the second control signaling. The communications manager 620 may be configured as or otherwise support a means for selecting a sounding reference signal resource set from the first sounding reference signal resource set or the second sounding reference signal resource set based on the configuration statuses. The communications manager 620 may be configured as or otherwise support a means for transmitting one or more uplink transmissions on a PUSCH associated with the CG configuration using the sounding reference signal resource set selected from the first sounding reference signal resource set or the second sounding reference signal resource set.

By including or configuring the communications manager 620, the device 605 (for example, a processor controlling or otherwise coupled to the receiver 610, the transmitter 615, the communications manager 620, or a combination thereof) may support techniques for determining an association between one or more SRS resource sets and CG uplink transmission control parameters as well as a mapping pattern between CG uplink transmissions and SRS resource sets, reducing a difficulty in processing, reducing power consumption, and enhancing the utilization of communication resources.

Figure 7:
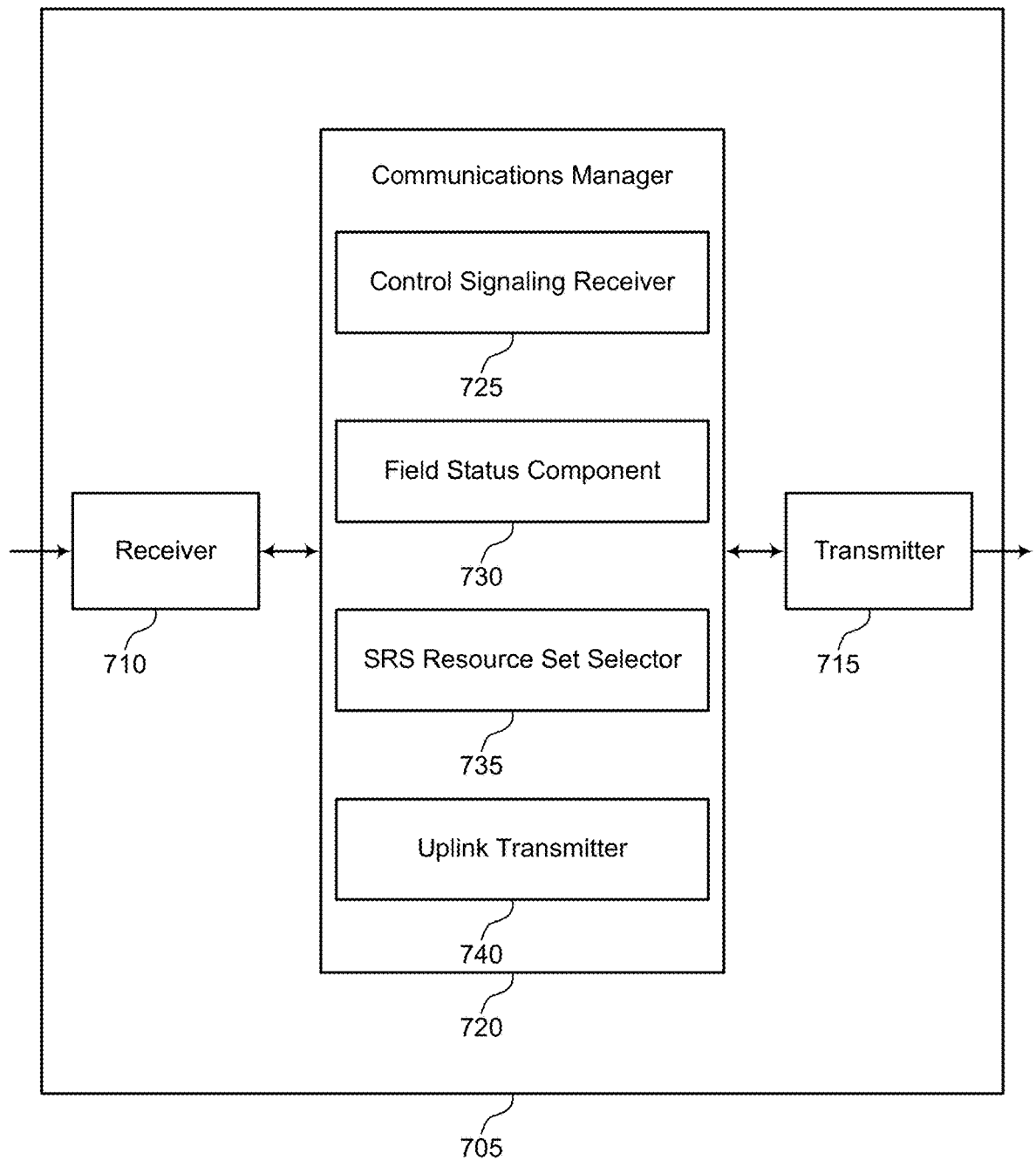

FIG. 7 shows a block diagram of a device 705 that supports SRI association for CG-based TRP PUSCH transmission in accordance with aspects of the present disclosure. The device 705 may be an example of aspects of a device 605 or a UE 115. The device 705 may include a receiver 710, a transmitter 715, and a communications manager 720. The communications manager 720 can be implemented, at least in part, by one or both of a modem and a processor. Each of these components may be in communication with one another (for example, via one or more buses).

The receiver 710 may provide a means for receiving information such as packets, user data, control information, or any combination thereof associated with various information channels (for example, control channels, data channels, information channels related to SRI association for CG-based TRP PUSCH repetition). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (for example, control channels, data channels, information channels related to SRI association for CG-based TRP PUSCH repetition). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of SRI association for CG-based TRP PUSCH repetition. For example, the communications manager 720 may include a control signaling receiver 725, a field status component 730, an SRS resource set selector 735, an uplink transmitter 740, or any combination thereof. In some examples, the communications manager 720, or various components thereof, may be configured to perform various operations (for example, receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations.

The communications manager 720 may support wireless communication at a UE in accordance with examples as disclosed herein. The control signaling receiver 725 may be configured as or otherwise support a means for receiving first control signaling indicating a first sounding reference signal resource set associated with a first set of power control parameters and a second sounding reference signal resource set associated with a second set of power control parameters. The control signaling receiver 725 may be configured as or otherwise support a means for receiving second control signaling indicating a CG configuration, the first set of power control parameters and the second set of power control parameters being for uplink transmissions and associated with the CG configuration. The field status component 730 may be configured as or otherwise support a means for determining a configuration status of each of one or more fields in RRC signaling based on one or both of the first control signaling or the second control signaling. The SRS resource set selector 735 may be configured as or otherwise support a means for selecting a sounding reference signal resource set from the first sounding reference signal resource set or the second sounding reference signal resource set based on the configuration statuses. The uplink transmitter 740 may be configured as or otherwise support a means for transmitting one or more uplink transmissions on a PUSCH associated with the CG configuration using the sounding reference signal resource set selected from the first sounding reference signal resource set or the second sounding reference signal resource set.

Figure 8:
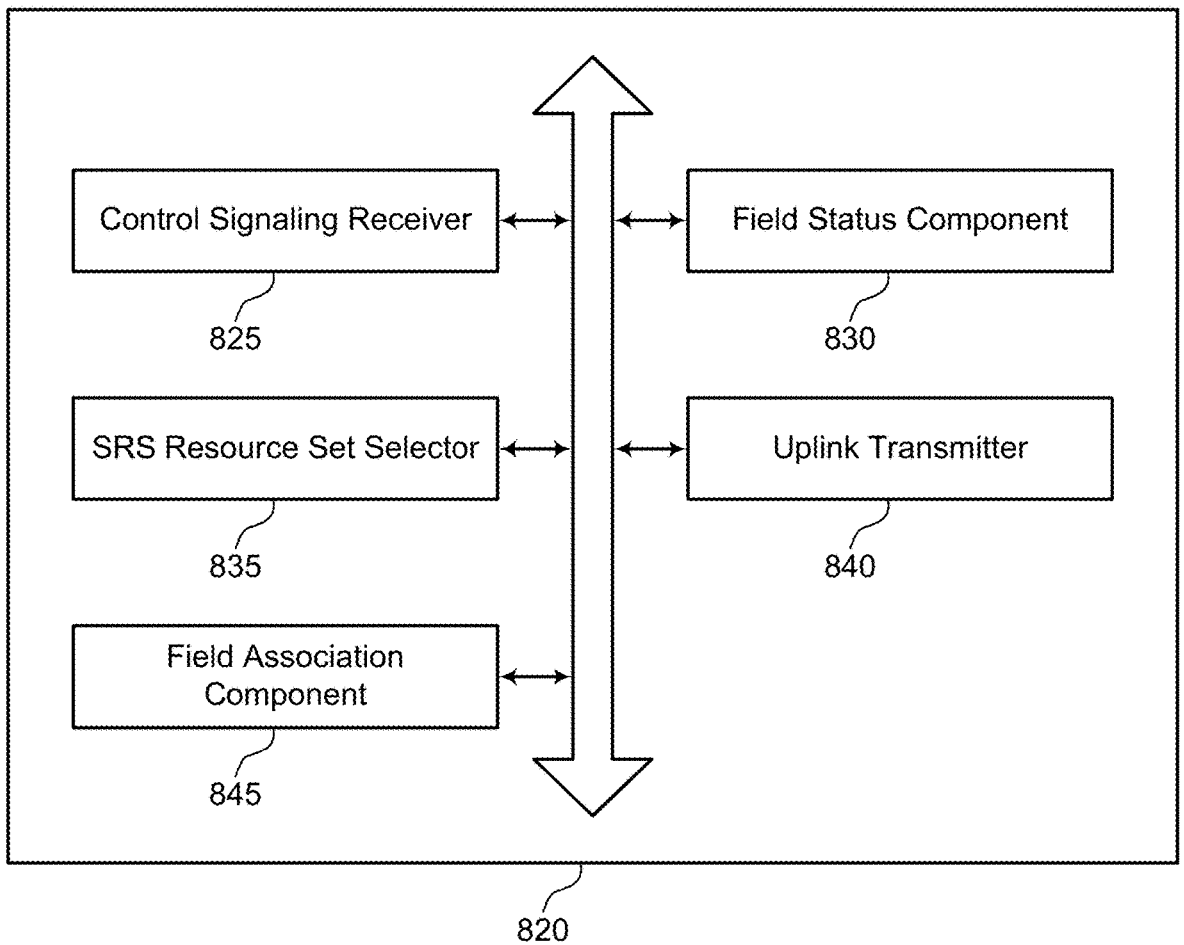
FIG. 8 shows a block diagram of a communications manager that supports SRI association for CG-based TRP PUSCH transmission in accordance with aspects of the present disclosure.

FIG. 8 shows a block diagram of a communications manager 820 that supports SRI association for CG-based TRP PUSCH transmission in accordance with aspects of the present disclosure. The communications manager 820, or various components thereof, may be an example of means for performing various aspects of SRI association for CG-based TRP PUSCH repetition. For example, the communications manager 820 may include a control signaling receiver 825, a field status component 830, an SRS resource set selector 835, an uplink transmitter 840, a field association component 845, or any combination thereof. Each of these components may communicate, directly or indirectly, with one another (for example, via one or more buses).

The communications manager 820 may support wireless communication at a UE in accordance with examples as disclosed herein. The control signaling receiver 825 may be configured as or otherwise support a means for receiving first control signaling indicating a first sounding reference signal resource set associated with a first set of power control parameters and a second sounding reference signal resource set associated with a second set of power control parameters. In some examples, the control signaling receiver 825 may be configured as or otherwise support a means for receiving second control signaling indicating a CG configuration, the first set of power control parameters and the second set of power control parameters being for uplink transmissions and associated with the CG configuration. The field status component 830 may be configured as or otherwise support a means for determining a configuration status of each of one or more fields in RRC signaling based on one or both of the first control signaling or the second control signaling. The SRS resource set selector 835 may be configured as or otherwise support a means for selecting a sounding reference signal resource set from the first sounding reference signal resource set or the second sounding reference signal resource set based on the configuration statuses. The uplink transmitter 840 may be configured as or otherwise support a means for transmitting one or more uplink transmissions on a PUSCH associated with the CG configuration using the sounding reference signal resource set selected from the first sounding reference signal resource set or the second sounding reference signal resource set.

In some examples, to support determining the configuration status of the one or more fields in the RRC signaling, the field status component 830 may be configured as or otherwise support a means for determining that one or more second fields of the one or more fields are not configured.

In some examples, to support selecting the sounding reference signal resource set, the SRS resource set selector 835 may be configured as or otherwise support a means for selecting the first sounding reference signal resource set based on one or more first fields of the being associated with the first sounding reference signal resource set. In some examples, the one or more fields include one or both of a sounding reference signal resource indicator field or a precoding and number of layers field.

In some examples, the control signaling receiver 825 may be configured as or otherwise support a means for receiving third control signaling indicating that the one or more fields are associated with one of the first sounding reference signal resource set or the second sounding reference signal resource set.

In some examples, the one or more fields include one or both of a sounding reference signal resource indicator field or a precoding and number of layers field. In some examples, one or both of the first control signaling or the second control signaling include the third control signaling.

In some examples, to support determining the configuration statuses of the one or more fields in the RRC signaling, the field status component 830 may be configured as or otherwise support a means for determining that one or more second fields of the one or more fields are configured.

In some examples, the field association component 845 may be configured as or otherwise support a means for determining that one or more first fields of the one or more fields in the RRC signaling are associated with the first sounding reference signal resource set and that the one or more second fields of the one or more fields in the RRC signaling are associated with the second sounding reference signal resource set, in which selecting the sounding reference signal resource set from the first sounding reference signal resource set or the second sounding reference signal resource set is based on determining that the one or more first fields are associated with the first sounding reference signal resource set and that the one or more second fields are associated with the second sounding reference signal resource set.

In some examples, to support selecting the sounding reference signal resource set, the SRS resource set selector 835 may be configured as or otherwise support a means for selecting the sounding reference signal resource set based on a fixed order for the one or more uplink transmissions.

In some examples, to support selecting the sounding reference signal resource set based on the fixed order for the one or more uplink transmissions, the SRS resource set selector 835 may be configured as or otherwise support a means for selecting the first sounding reference signal resource set for a first uplink transmission in time of the one or more uplink transmissions and selecting the first sounding reference signal resource set or the second sounding reference signal resource set for one or more second uplink transmissions in time of the one or more uplink transmissions based on a mapping type.

In some examples, the mapping type includes a cyclic mapping of the first sounding reference signal resource set and the second sounding reference signal resource set. In some examples, the mapping type includes a sequential mapping of the first sounding reference signal resource set and the second sounding reference signal resource set.

In some examples, the control signaling receiver 825 may be configured as or otherwise support a means for receiving third control signaling having a field indicating that the first uplink transmission in time of the one or more uplink transmissions is associated with one of the first sounding reference signal resource set or the second sounding reference signal resource set, in which transmitting the one or more uplink transmissions is based on the third control signaling.

In some examples, the control signaling receiver 825 may be configured as or otherwise support a means for receiving third control signaling having a field indicating one of a fixed set of preconfigured mapping options associated with one or both of the first sounding reference signal resource set or the second sounding reference signal resource set.

In some examples, the fixed set of preconfigured mapping options includes one or more of a first uplink transmission in time of the one or more uplink transmissions associated with the first sounding reference signal resource set and a second uplink transmission in time of the one or more uplink transmissions associated with the second sounding reference signal resource set, a first uplink transmission in time of the one or more uplink transmissions associated with the second sounding reference signal resource set and a second uplink transmission in time of the one or more uplink transmissions associated with the first sounding reference signal resource set, the one or more uplink transmissions associated with the first sounding reference signal resource set, or the one or more uplink transmissions associated with the second sounding reference signal resource set.

In some examples, the CG configuration includes a Type 1 CG PUSCH configuration. In some examples, the one or more fields in the RRC signaling includes one or more of a sounding reference signal resource indicator field, a precoding and number of layers field, or a pathloss reference index field. In some examples, the RRC signaling includes one or both of the first control signaling or the second control signaling.

In some examples, to support receiving the second control signaling indicating the CG configuration, the control signaling receiver 825 may be configured as or otherwise support a means for receiving second control signaling indicating a CG PUSCH configuration.

In some examples, the one or more uplink transmissions include codebook physical uplink shared channel transmissions or non-codebook physical uplink shared channel transmissions.

Figure 9:
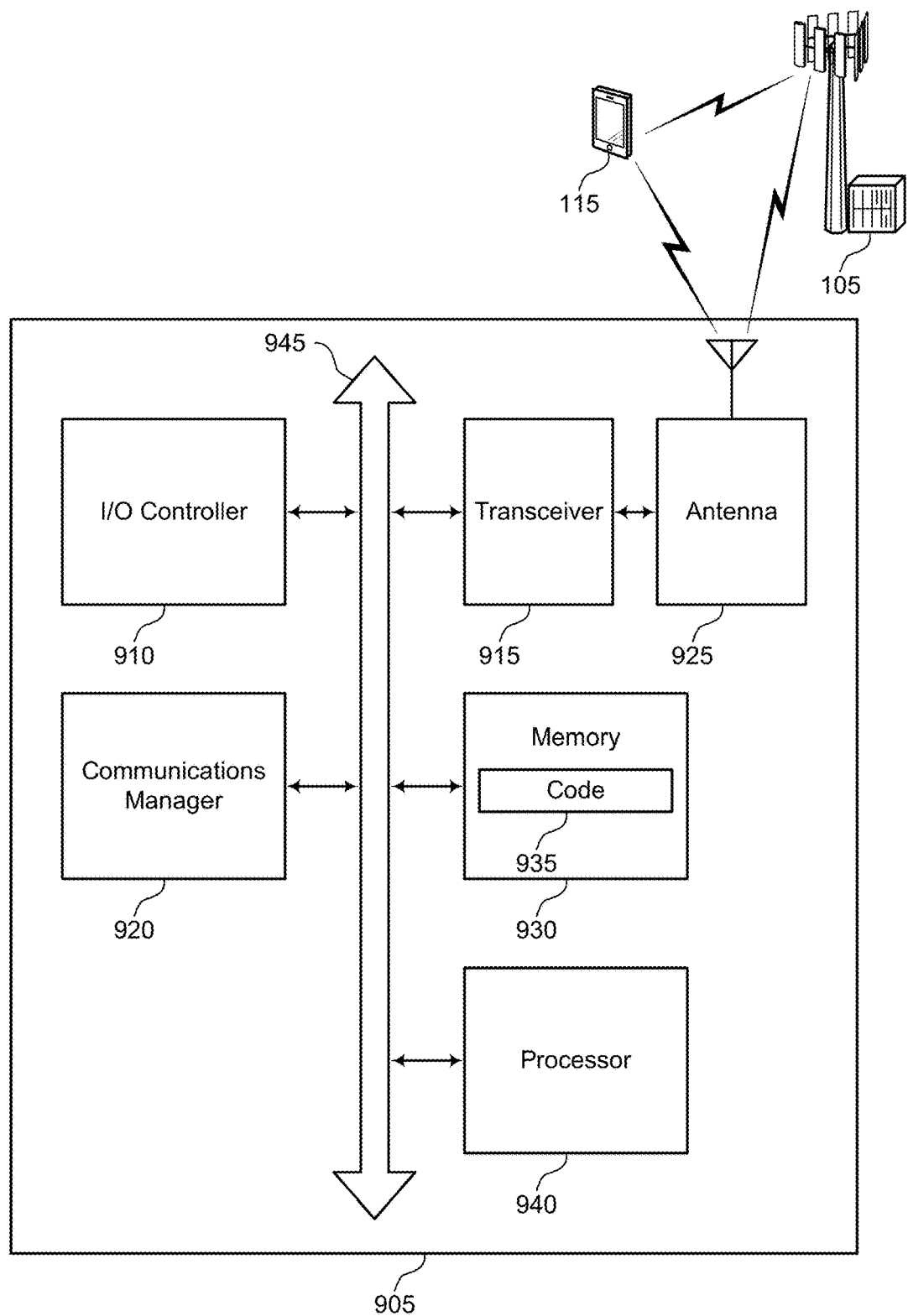
FIG. 9 shows a diagram of a system including a device that supports SRI association for CG-based TRP PUSCH transmission in accordance with aspects of the present disclosure.

FIG. 9 shows a diagram of a system including a device 905 that supports SRI association for CG-based TRP PUSCH transmission in accordance with aspects of the present disclosure. The device 905 may be an example of or include the components of a device 605, a device 705, or a UE 115. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (for example, operatively, communicatively, functionally, electronically, electrically) via one or more buses (for example, a bus 945).

The I/O controller 910 may manage input and output signals for the device 905. The I/O controller 910 may also manage peripherals not integrated into the device 905. In some examples, the I/O controller 910 may represent a physical connection or port to an external peripheral. In some examples, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some examples, the I/O controller 910 may be implemented as part of a processor, such as the processor 940. In some examples, a user may interact with the device 905 via the I/O controller 910 or via hardware components controlled by the I/O controller 910.

In some examples, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof.

The memory 930 may include random access memory (RAM) and read-only memory (ROM). The memory 930 may store computer-readable, computer-executable code 935 including instructions that, if executed by the processor 940, cause the device 905 to perform various functions described herein. The code 935 may be stored in a non-transitory computer-readable medium such as system memory or another type of memory. In some examples, the code 935 may not be directly executable by the processor 940 but may cause a computer (for example, if compiled and executed) to perform functions described herein. In some examples, the memory 930 may contain, among other things, a basic I/O system (BIOS) which may control basic hardware or software operation such as the interaction with peripheral components or devices.

The processor 940 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 940 may be configured to operate a memory array using a memory controller. In some other cases, a memory controller may be integrated into the processor 940. The processor 940 may be configured to execute computer-readable instructions stored in a memory (for example, the memory 930) to cause the device 905 to perform various functions (for example, functions or tasks supporting SRI association for CG-based TRP PUSCH repetition). The communications manager 920 can be implemented, at least in part, by one or both of a modem and a processor.

The communications manager 920 may support wireless communication at a UE in accordance with examples as disclosed herein. For example, the communications manager 920 may be configured as or otherwise support a means for receiving first control signaling indicating a first sounding reference signal resource set associated with a first set of power control parameters and a second sounding reference signal resource set associated with a second set of power control parameters. The communications manager 920 may be configured as or otherwise support a means for receiving second control signaling indicating a CG configuration, the first set of power control parameters and the second set of power control parameters being for uplink transmissions and associated with the CG configuration. The communications manager 920 may be configured as or otherwise support a means for determining a configuration status of each of one or more fields in RRC signaling based on one or both of the first control signaling or the second control signaling. The communications manager 920 may be configured as or otherwise support a means for selecting a sounding reference signal resource set from the first sounding reference signal resource set or the second sounding reference signal resource set based on the configuration statuses. The communications manager 920 may be configured as or otherwise support a means for transmitting one or more uplink transmissions on a PUSCH associated with the CG configuration using the sounding reference signal resource set selected from the first sounding reference signal resource set or the second sounding reference signal resource set.

By including or configuring the communications manager 920, the device 905 may support techniques for determining an association between one or more SRS resource sets and CG uplink transmission control parameters as well as a mapping pattern between CG uplink transmissions and SRS resource sets, mitigating a difficulty in determining transmission parameters, reducing power consumption, improving coordination between devices, and improving utilization of processing capability.

In some examples, the communications manager 920 may be configured to perform various operations (for example, receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of SRI association for CG-based TRP PUSCH repetition, or the processor 940 and the memory 930 may be otherwise configured to perform or support such operations.

Figure 10:
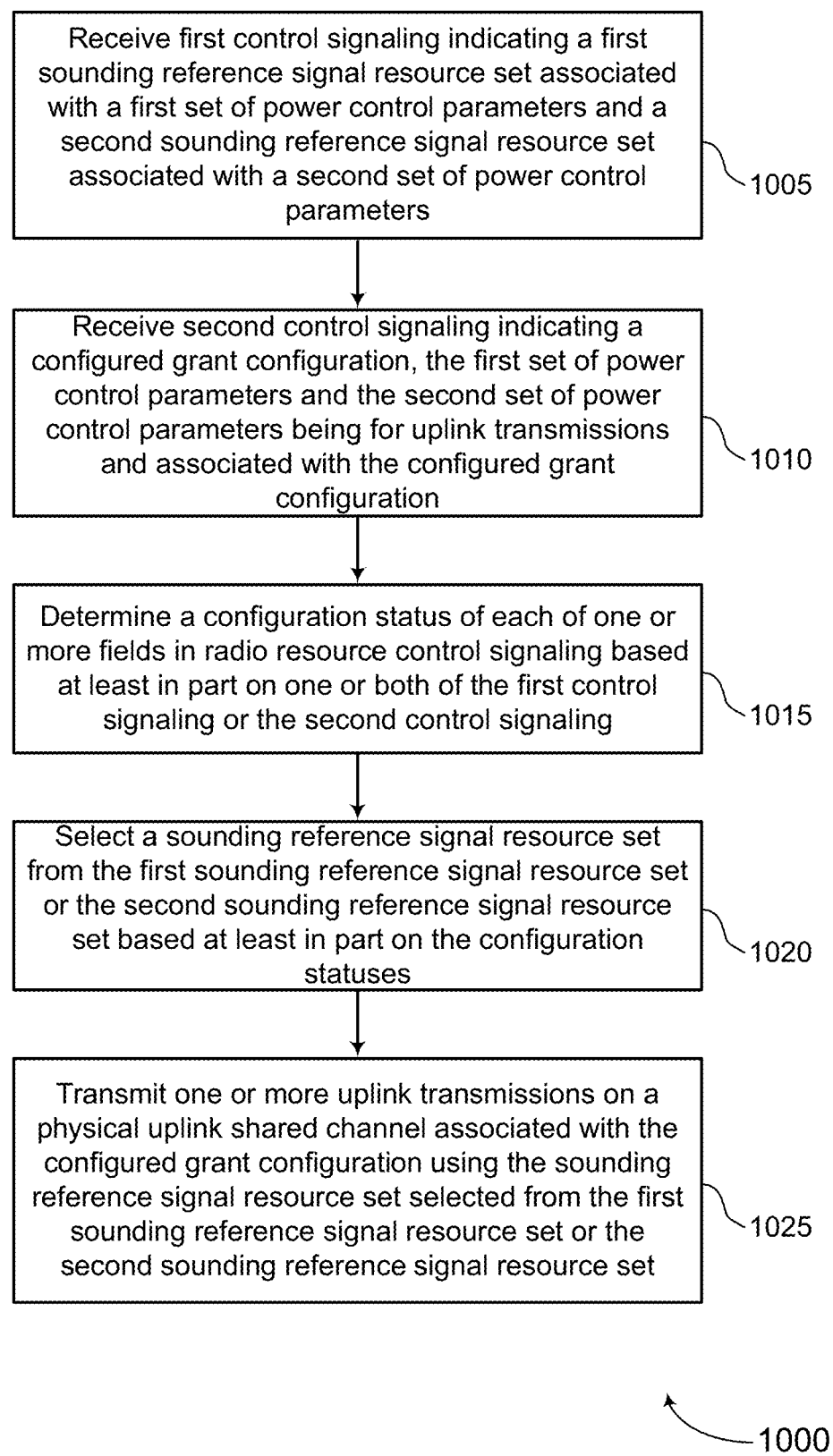
FIGS. 10-14 show flowcharts illustrating methods that support SRI association for CG-based TRP PUSCH transmission in accordance with aspects of the present disclosure.

FIG. 10 shows a flowchart illustrating a method 1000 that supports SRI association for CG-based TRP PUSCH transmission in accordance with aspects of the present disclosure. The operations of the method 1000 may be implemented by a UE or its components. For example, the operations of the method 1000 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1005, the method may include receiving first control signaling indicating a first sounding reference signal resource set associated with a first set of power control parameters and a second sounding reference signal resource set associated with a second set of power control parameters. The operations of 1005 may be performed in accordance with examples as disclosed herein. In some examples, aspects of the operations of 1005 may be performed by a control signaling receiver 825 as described with reference to FIG. 8.

At 1010, the method may include receiving second control signaling indicating a CG configuration, the first set of power control parameters and the second set of power control parameters being for uplink transmissions and associated with the CG configuration. The operations of 1010 may be performed in accordance with examples as disclosed herein. In some examples, aspects of the operations of 1010 may be performed by a control signaling receiver 825 as described with reference to FIG. 8.

At 1015, the method may include determining a configuration status of each of one or more fields in RRC signaling based on one or both of the first control signaling or the second control signaling. The operations of 1015 may be performed in accordance with examples as disclosed herein. In some examples, aspects of the operations of 1015 may be performed by a field status component 830 as described with reference to FIG. 8.

At 1020, the method may include selecting a sounding reference signal resource set from the first sounding reference signal resource set or the second sounding reference signal resource set based on the configuration statuses. The operations of 1020 may be performed in accordance with examples as disclosed herein. In some examples, aspects of the operations of 1020 may be performed by an SRS resource set selector 835 as described with reference to FIG. 8.

At 1025, the method may include transmitting one or more uplink transmissions on a PUSCH associated with the CG configuration using the sounding reference signal resource set selected from the first sounding reference signal resource set or the second sounding reference signal resource set. The operations of 1025 may be performed in accordance with examples as disclosed herein. In some examples, aspects of the operations of 1025 may be performed by an uplink transmitter 840 as described with reference to FIG. 8.

Figure 11:
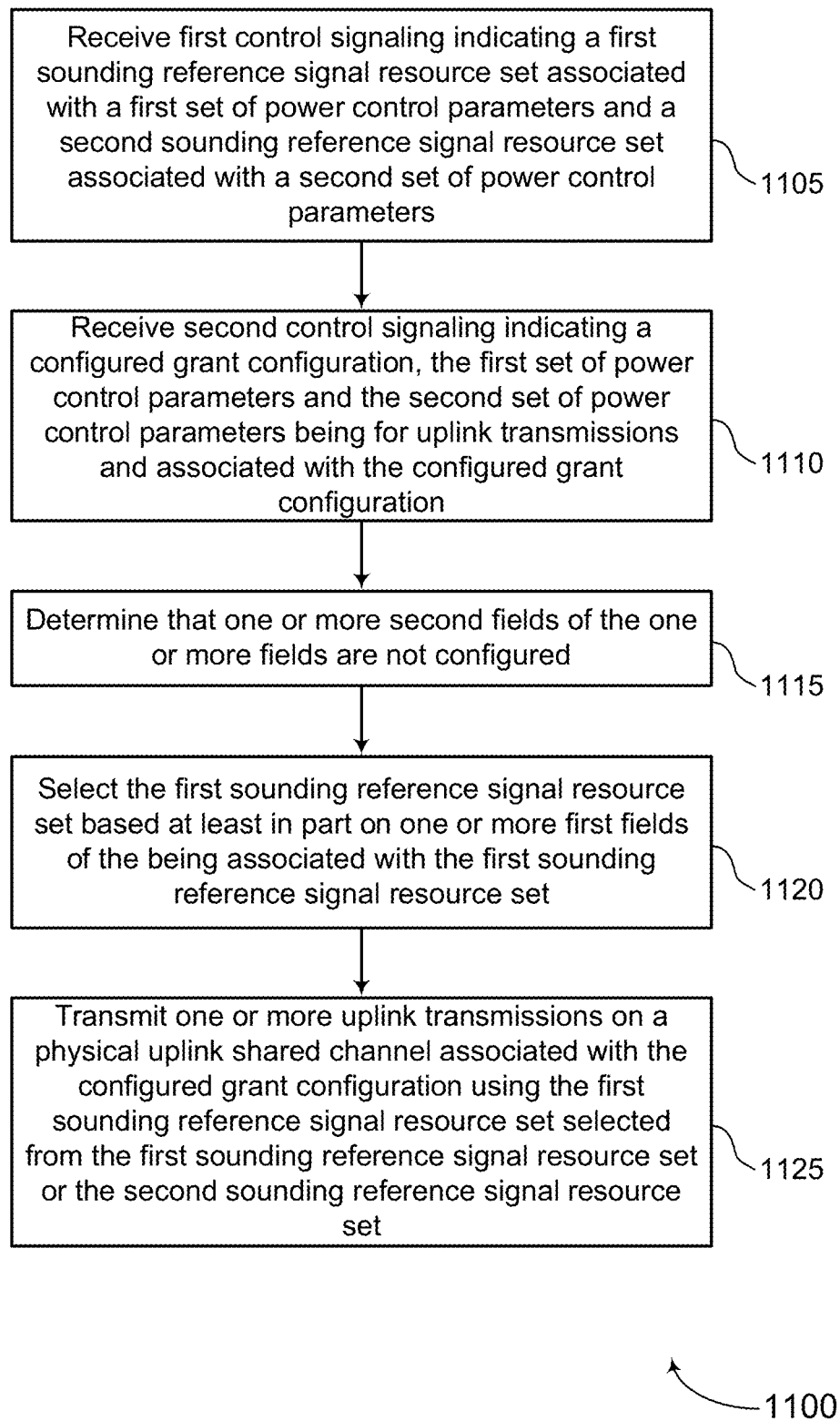

FIG. 11 shows a flowchart illustrating a method 1100 that supports SRI association for CG-based TRP PUSCH transmission in accordance with aspects of the present disclosure. The operations of the method 1100 may be implemented by a UE or its components. For example, the operations of the method 1100 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1105, the method may include receiving first control signaling indicating a first sounding reference signal resource set associated with a first set of power control parameters and a second sounding reference signal resource set associated with a second set of power control parameters. The operations of 1105 may be performed in accordance with examples as disclosed herein. In some examples, aspects of the operations of 1105 may be performed by a control signaling receiver 825 as described with reference to FIG. 8.

At 1110, the method may include receiving second control signaling indicating a CG configuration, the first set of power control parameters and the second set of power control parameters being for uplink transmissions and associated with the CG configuration. The operations of 1110 may be performed in accordance with examples as disclosed herein. In some examples, aspects of the operations of 1110 may be performed by a control signaling receiver 825 as described with reference to FIG. 8.

At 1115, the method may include determining that one or more second fields of the one or more fields are not configured. The operations of 1115 may be performed in accordance with examples as disclosed herein. In some examples, aspects of the operations of 1115 may be performed by a field status component 830 as described with reference to FIG. 8.

At 1120, the method may include selecting the first sounding reference signal resource set based on one or more first fields of the being associated with the first sounding reference signal resource set. The operations of 1120 may be performed in accordance with examples as disclosed herein. In some examples, aspects of the operations of 1120 may be performed by an SRS resource set selector 835 as described with reference to FIG. 8.

At 1125, the method may include transmitting one or more uplink transmissions on a PUSCH associated with the CG configuration using the first sounding reference signal resource set selected from the first sounding reference signal resource set or the second sounding reference signal resource set. The operations of 1125 may be performed in accordance with examples as disclosed herein. In some examples, aspects of the operations of 1125 may be performed by an uplink transmitter 840 as described with reference to FIG. 8.

Figure 12:
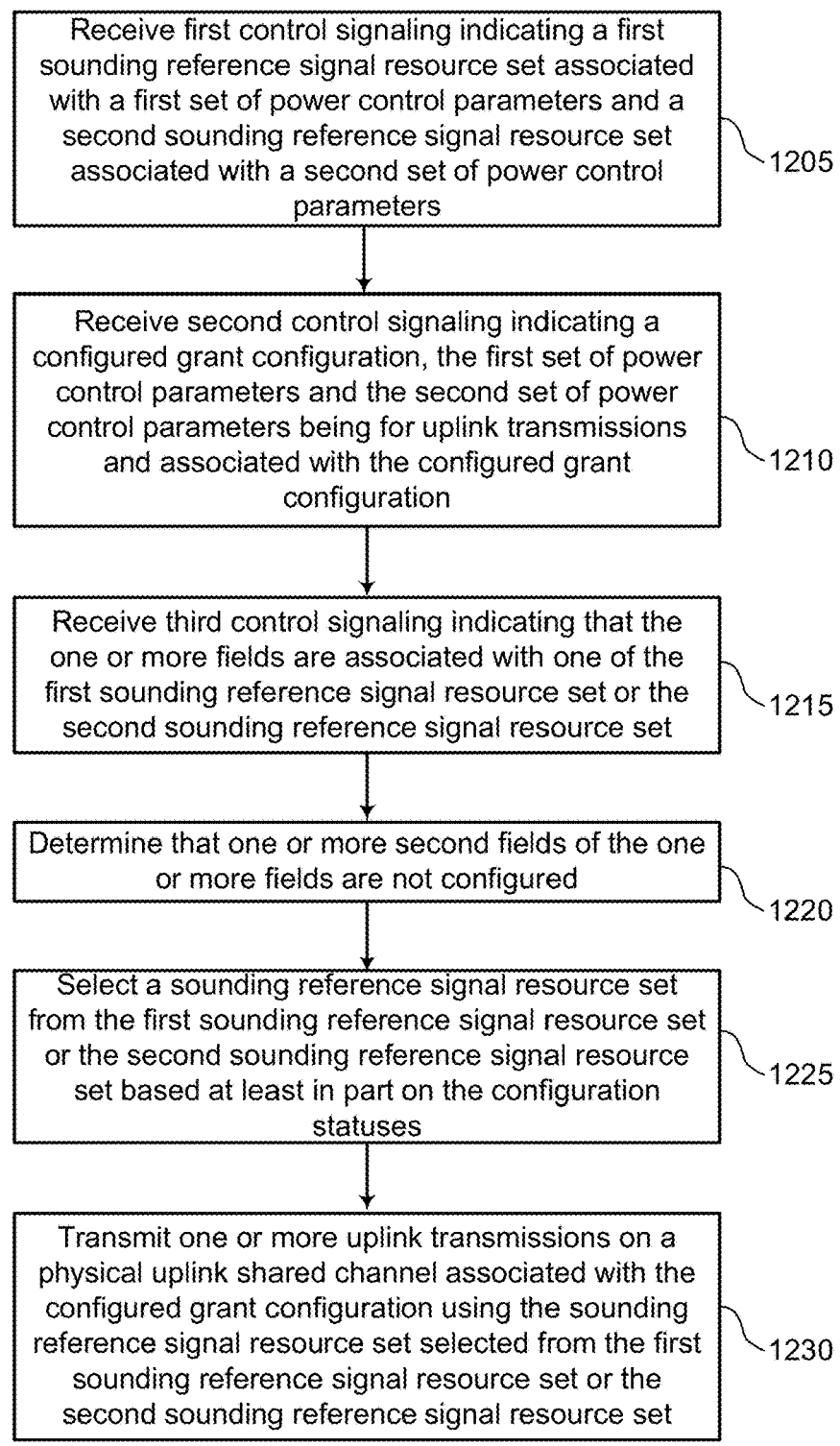

FIG. 12 shows a flowchart illustrating a method 1200 that supports SRI association for CG-based TRP PUSCH transmission in accordance with aspects of the present disclosure. The operations of the method 1200 may be implemented by a UE or its components. For example, the operations of the method 1200 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1205, the method may include receiving first control signaling indicating a first sounding reference signal resource set associated with a first set of power control parameters and a second sounding reference signal resource set associated with a second set of power control parameters. The operations of 1205 may be performed in accordance with examples as disclosed herein. In some examples, aspects of the operations of 1205 may be performed by a control signaling receiver 825 as described with reference to FIG. 8.

At 1210, the method may include receiving second control signaling indicating a CG configuration, the first set of power control parameters and the second set of power control parameters being for uplink transmissions and associated with the CG configuration. The operations of 1210 may be performed in accordance with examples as disclosed herein. In some examples, aspects of the operations of 1210 may be performed by a control signaling receiver 825 as described with reference to FIG. 8.

At 1215, the method may include receiving third control signaling indicating that the one or more fields are associated with one of the first sounding reference signal resource set or the second sounding reference signal resource set. The operations of 1215 may be performed in accordance with examples as disclosed herein. In some examples, aspects of the operations of 1215 may be performed by a control signaling receiver 825 as described with reference to FIG. 8.

At 1220, the method may include determining that one or more second fields of the one or more fields are not configured. The operations of 1220 may be performed in accordance with examples as disclosed herein. In some examples, aspects of the operations of 1220 may be performed by a field status component 830 as described with reference to FIG. 8.

At 1225, the method may include selecting a sounding reference signal resource set from the first sounding reference signal resource set or the second sounding reference signal resource set based on the configuration statuses. The operations of 1225 may be performed in accordance with examples as disclosed herein. In some examples, aspects of the operations of 1225 may be performed by an SRS resource set selector 835 as described with reference to FIG. 8.

At 1230, the method may include transmitting one or more uplink transmissions on a PUSCH associated with the CG configuration using the sounding reference signal resource set selected from the first sounding reference signal resource set or the second sounding reference signal resource set. The operations of 1230 may be performed in accordance with examples as disclosed herein. In some examples, aspects of the operations of 1230 may be performed by an uplink transmitter 840 as described with reference to FIG. 8.

Figure 13:
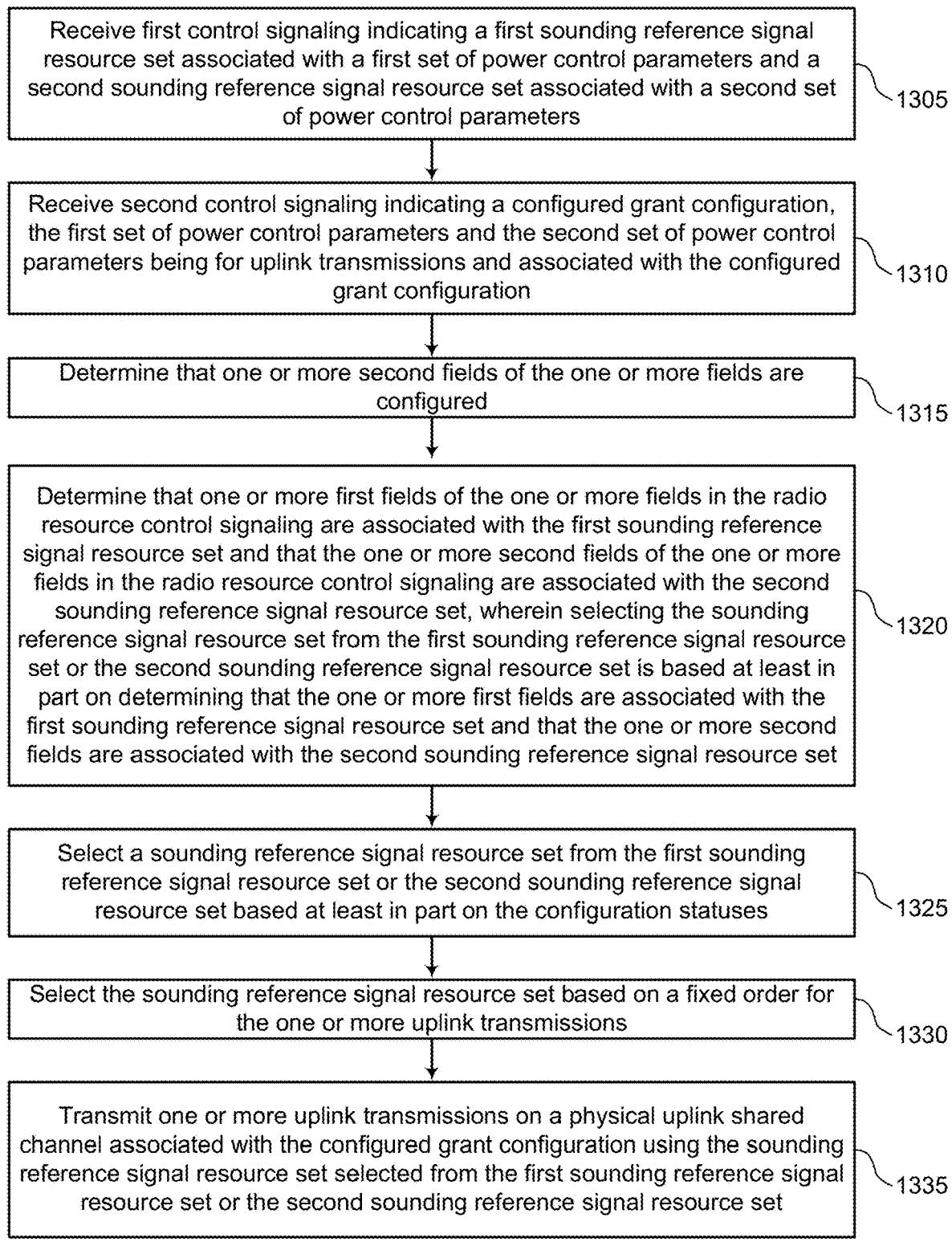

FIG. 13 shows a flowchart illustrating a method 1300 that supports SRI association for CG-based TRP PUSCH transmission in accordance with aspects of the present disclosure. The operations of the method 1300 may be implemented by a UE or its components. For example, the operations of the method 1300 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1305, the method may include receiving first control signaling indicating a first sounding reference signal resource set associated with a first set of power control parameters and a second sounding reference signal resource set associated with a second set of power control parameters. The operations of 1305 may be performed in accordance with examples as disclosed herein. In some examples, aspects of the operations of 1305 may be performed by a control signaling receiver 825 as described with reference to FIG. 8.

At 1310, the method may include receiving second control signaling indicating a CG configuration, the first set of power control parameters and the second set of power control parameters being for uplink transmissions and associated with the CG configuration. The operations of 1310 may be performed in accordance with examples as disclosed herein. In some examples, aspects of the operations of 1310 may be performed by a control signaling receiver 825 as described with reference to FIG. 8.

At 1315, the method may include determining that one or more second fields of the one or more fields are configured. The operations of 1315 may be performed in accordance with examples as disclosed herein. In some examples, aspects of the operations of 1315 may be performed by a field status component 830 as described with reference to FIG. 8.

At 1320, the method may include determining that one or more first fields of the one or more fields in the RRC signaling are associated with the first sounding reference signal resource set and that the one or more second fields of the one or more fields in the RRC signaling are associated with the second sounding reference signal resource set, in which selecting the sounding reference signal resource set from the first sounding reference signal resource set or the second sounding reference signal resource set is based on determining that the one or more first fields are associated with the first sounding reference signal resource set and that the one or more second fields are associated with the second sounding reference signal resource set. The operations of 1320 may be performed in accordance with examples as disclosed herein. In some examples, aspects of the operations of 1320 may be performed by a field association component 845 as described with reference to FIG. 8.

At 1325, the method may include selecting a sounding reference signal resource set from the first sounding reference signal resource set or the second sounding reference signal resource set based on the configuration statuses. The operations of 1325 may be performed in accordance with examples as disclosed herein. In some examples, aspects of the operations of 1325 may be performed by an SRS resource set selector 835 as described with reference to FIG. 8.

At 1330, the method may include selecting the sounding reference signal resource set based on a fixed order for the one or more uplink transmissions. The operations of 1330 may be performed in accordance with examples as disclosed herein. In some examples, aspects of the operations of 1330 may be performed by an SRS resource set selector 835 as described with reference to FIG. 8.

At 1335, the method may include transmitting one or more uplink transmissions on a PUSCH associated with the CG configuration using the sounding reference signal resource set selected from the first sounding reference signal resource set or the second sounding reference signal resource set. The operations of 1335 may be performed in accordance with examples as disclosed herein. In some examples, aspects of the operations of 1335 may be performed by an uplink transmitter 840 as described with reference to FIG. 8.

Figure 14:
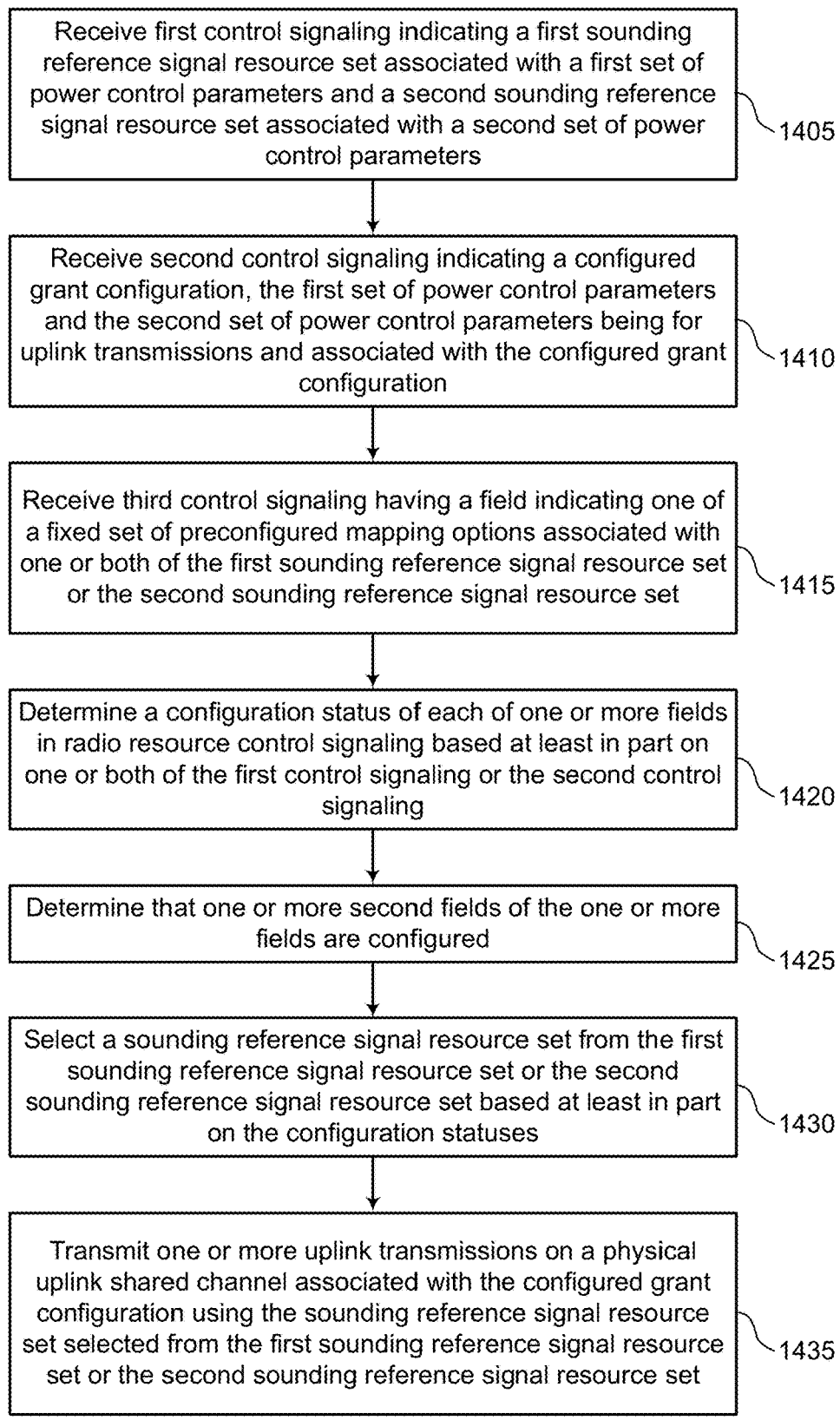

FIG. 14 shows a flowchart illustrating a method 1400 that supports SRI association for CG-based TRP PUSCH transmission in accordance with aspects of the present disclosure. The operations of the method 1400 may be implemented by a UE or its components. For example, the operations of the method 1400 may be performed by a UE 115 as described with reference to FIGS. 1-9. In some examples, a UE may execute a set of instructions to control the functional elements of the UE to perform the described functions. Additionally or alternatively, the UE may perform aspects of the described functions using special-purpose hardware.

At 1405, the method may include receiving first control signaling indicating a first sounding reference signal resource set associated with a first set of power control parameters and a second sounding reference signal resource set associated with a second set of power control parameters. The operations of 1405 may be performed in accordance with examples as disclosed herein. In some examples, aspects of the operations of 1405 may be performed by a control signaling receiver 825 as described with reference to FIG. 8.

At 1410, the method may include receiving second control signaling indicating a CG configuration, the first set of power control parameters and the second set of power control parameters being for uplink transmissions and associated with the CG configuration. The operations of 1410 may be performed in accordance with examples as disclosed herein. In some examples, aspects of the operations of 1410 may be performed by a control signaling receiver 825 as described with reference to FIG. 8.

At 1415, the method may include receiving third control signaling having a field indicating one of a fixed set of preconfigured mapping options associated with one or both of the first sounding reference signal resource set or the second sounding reference signal resource set. The operations of 1415 may be performed in accordance with examples as disclosed herein. In some examples, aspects of the operations of 1415 may be performed by a control signaling receiver 825 as described with reference to FIG. 8.

At 1420, the method may include determining a configuration status of each of one or more fields in RRC signaling based on one or both of the first control signaling or the second control signaling. The operations of 1420 may be performed in accordance with examples as disclosed herein. In some examples, aspects of the operations of 1420 may be performed by a field status component 830 as described with reference to FIG. 8.

At 1425, the method may include determining that one or more second fields of the one or more fields are configured. The operations of 1425 may be performed in accordance with examples as disclosed herein. In some examples, aspects of the operations of 1425 may be performed by a field status component 830 as described with reference to FIG. 8.

At 1430, the method may include selecting a sounding reference signal resource set from the first sounding reference signal resource set or the second sounding reference signal resource set based on the configuration statuses. The operations of 1430 may be performed in accordance with examples as disclosed herein. In some examples, aspects of the operations of 1430 may be performed by an SRS resource set selector 835 as described with reference to FIG. 8.

At 1435, the method may include transmitting one or more uplink transmissions on a PUSCH associated with the CG configuration using the sounding reference signal resource set selected from the first sounding reference signal resource set or the second sounding reference signal resource set. The operations of 1435 may be performed in accordance with examples as disclosed herein. In some examples, aspects of the operations of 1435 may be performed by an uplink transmitter 840 as described with reference to FIG. 8.

The following provides an overview of aspects of the present disclosure:

Aspect 1: A method for wireless communication at a UE, comprising: receiving first control signaling indicating a first sounding reference signal resource set associated with a first set of power control parameters and a second sounding reference signal resource set associated with a second set of power control parameters; receiving second control signaling indicating a configured grant configuration, the first set of power control parameters and the second set of power control parameters being for uplink transmissions and associated with the configured grant configuration; determining a configuration status of each of one or more fields in radio resource control signaling based at least in part on one or both of the first control signaling or the second control signaling; selecting a sounding reference signal resource set from the first sounding reference signal resource set or the second sounding reference signal resource set based at least in part on the configuration statuses; transmitting one or more uplink transmissions on a physical uplink shared channel associated with the configured grant configuration using the sounding reference signal resource set selected from the first sounding reference signal resource set or the second sounding reference signal resource set.

Aspect 2: The method of aspect 1, wherein determining the configuration statuses of the one or more fields in the radio resource control signaling comprises: determining that one or more second fields of the one or more fields are not configured.

Aspect 3: The method of aspect 2, wherein selecting the sounding reference signal resource set comprises: selecting the first sounding reference signal resource set based at least in part on one or more first fields of the being associated with the first sounding reference signal resource set.

Aspect 4: The method of aspect 3, wherein the one or more fields comprise one or both of a sounding reference signal resource indicator field or a precoding and number of layers field.

Aspect 5: The method of any of aspects 2 through 4, further comprising: receiving third control signaling indicating that the one or more fields are associated with one of the first sounding reference signal resource set or the second sounding reference signal resource set.

Aspect 6: The method of aspect 5, wherein the one or more fields comprise one or both of a sounding reference signal resource indicator field or a precoding and number of layers field, and one or both of the first control signaling or the second control signaling comprise the third control signaling.

Aspect 7: The method of any of aspects 1 through 6, wherein determining the configuration statuses of the one or more fields in the radio resource control signaling comprises: determining that one or more second fields of the one or more fields are configured.

Aspect 8: The method of aspect 7, further comprising: determining that one or more first fields of the one or more fields in the radio resource control signaling are associated with the first sounding reference signal resource set and that the one or more second fields of the one or more fields in the radio resource control signaling are associated with the second sounding reference signal resource set, wherein selecting the sounding reference signal resource set from the first sounding reference signal resource set or the second sounding reference signal resource set is based at least in part on determining that the one or more first fields are associated with the first sounding reference signal resource set and that the one or more second fields are associated with the second sounding reference signal resource set.

Aspect 9: The method of aspect 8, wherein selecting the sounding reference signal resource set comprises: selecting the sounding reference signal resource set based on a fixed order for the one or more uplink transmissions.

Aspect 10: The method of aspect 9, wherein selecting the sounding reference signal resource set based on the fixed order for the one or more uplink transmissions comprises: selecting the first sounding reference signal resource set for a first uplink transmission in time of the one or more uplink transmissions and selecting the first sounding reference signal resource set or the second sounding reference signal resource set for one or more second uplink transmissions in time of the one or more uplink transmissions based at least in part on a mapping type.

Aspect 11: The method of aspect 10, wherein the mapping type comprises a cyclic mapping of the first sounding reference signal resource set and the second sounding reference signal resource set.

Aspect 12: The method of any of aspects 10 through 11, wherein the mapping type comprises a sequential mapping of the first sounding reference signal resource set and the second sounding reference signal resource set.

Aspect 13: The method of any of aspects 10 through 12, further comprising: receiving third control signaling having a field indicating that the first uplink transmission in time of the one or more uplink transmissions is associated with one of the first sounding reference signal resource set or the second sounding reference signal resource set, wherein transmitting the one or more uplink transmissions is based at least in part on the third control signaling.

Aspect 14: The method of any of aspects 8 through 13, further comprising: receiving third control signaling having a field indicating one of a fixed set of preconfigured mapping options associated with one or both of the first sounding reference signal resource set or the second sounding reference signal resource set.

Aspect 15: The method of aspect 14, wherein the fixed set of preconfigured mapping options comprises one or more of a first uplink transmission in time of the one or more uplink transmissions associated with the first sounding reference signal resource set and a second uplink transmission in time of the one or more uplink transmissions associated with the second sounding reference signal resource set, a first uplink transmission in time of the one or more uplink transmissions associated with the second sounding reference signal resource set and a second uplink transmission in time of the one or more uplink transmissions associated with the first sounding reference signal resource set, the one or more uplink transmissions associated with the first sounding reference signal resource set, or the one or more uplink transmissions associated with the second sounding reference signal resource set.

Aspect 16: The method of any of aspects 1 through 15, wherein the configured grant configuration comprises a Type 1 configured grant physical uplink shared channel configuration.

Aspect 17: The method of any of aspects 1 through 16, wherein the one or more fields in the radio resource control signaling comprises one or more of a sounding reference signal resource indicator field, a precoding and number of layers field, or a pathloss reference index field.

Aspect 18: The method of any of aspects 1 through 17, wherein the radio resource control signaling comprises one or both of the first control signaling or the second control signaling.

Aspect 19: The method of any of aspects 1 through 18, wherein receiving the second control signaling indicating the configured grant configuration comprises: receiving second control signaling indicating a configured grant physical uplink shared channel configuration.

Aspect 20: The method of any of aspects 1 through 19, wherein the one or more uplink transmissions comprise codebook physical uplinks shared channel transmissions or non-codebook physical uplinks shared channel transmissions.

Aspect 21: An apparatus for wireless communication at a UE, comprising a processor; memory coupled with the processor; and instructions stored in the memory and executable by the processor to cause the apparatus to perform a method of any of aspects 1 through 20.

Aspect 22: An apparatus for wireless communication at a UE, comprising at least one means for performing a method of any of aspects 1 through 20.

Aspect 23: A non-transitory computer-readable medium storing code for wireless communication at a UE, the code comprising instructions executable by a processor to perform a method of any of aspects 1 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. As such, the disclosure is not limited to the examples and designs described herein but is to be accorded the broadest scope consistent with the principles and novel features disclosed herein.

What is claimed is:

1. A user equipment (UE) for wireless communication, comprising:
at least one memory; and
at least one processor coupled to the at least one memory, wherein the at least one processor is configured to:
receive first control signaling indicating a first sounding reference signal (SRS) resource set and a second SRS resource set;
receive second control signaling indicating a first SRS indicator without a second SRS indicator and indicating a first precoding and number of layers field without a second precoding and number of layers field; and
transmit one or more uplink transmissions on a physical uplink shared channel using the first SRS resource set based on the second control signaling.

2. The UE of claim 1, the one or more uplink transmissions are associated with a Type 1 configured grant.

3. The UE of claim 1, wherein the second control signaling indicates one or more of a pathloss reference index field, a p0-PUSCH-Alpha field, or a powerControlLoopToUse field.

4. The UE of claim 1, wherein one or both of the first control signaling or the second control signaling comprise radio resource control signaling.

5. The UE of claim 1, wherein, to receive the second control signaling, the one or more processors are configured to execute the code to cause the UE to:
receive second control signaling indicating a configured grant physical uplink shared channel configuration.

6. The UE of claim 1, wherein the one or more uplink transmissions comprise codebook physical uplink shared channel transmissions or non-codebook physical uplink shared channel transmissions.

7. A user equipment (UE) for wireless communication, comprising:
at least one memory; and
at least one processor coupled to the at least one memory, wherein the at least one processor is configured to:
receive first control signaling indicating a first sounding reference signal resource (SRS) set and a second SRS resource set;
receive second control signaling indicating a first SRS resource indicator field and a second SRS resource indicator field and indicating a first precoding and number of layers field and a second precoding and number of layers field; and
transmit one or more codebook physical uplink shared channel transmissions on a physical uplink shared channel using the first SRS resource set or the second SRS resource set, wherein the first SRS resource indicator field is associated with the first SRS resource set and the second SRS resource indicator field is associated with the second SRS resource set.

8. The UE of claim 7, wherein the second control signaling indicates a first p0-PUSCH-Alpha field and a second p0-PUSCH-Alpha field.

9. The UE of claim 7, wherein using the first SRS resource set or the second SRS resource set is based on a fixed order for the one or more codebook physical uplink shared channel transmissions.

10. The UE of claim 9, wherein using the first SRS resource set or the second SRS resource set is based on a fixed order for the one or more codebook physical uplink shared channel transmissions comprises using the first SRS resource set for a first codebook physical uplink shared channel transmission in time of the one or more codebook physical uplink shared channel transmissions and using the second SRS resource set for one or more second codebook physical uplink shared channel transmissions in time of the one or more codebook physical uplink shared channel transmissions based on a mapping type.

11. The UE of claim 10, wherein the mapping type comprises a cyclic mapping of the first SRS resource set and the second SRS resource set.

12. The UE of claim 10, wherein the mapping type comprises a sequential mapping of the first SRS resource set and the second SRS resource set.

13. The UE of claim 7, wherein the one or more codebook physical uplink shared channel transmissions are associated with a Type 1 configured grant.

14. The UE of claim 7, wherein the second control signaling indicates a pathloss reference index field, a powerControlLoopToUse field, sounding reference signal resource indicator field, a precoding and number of layers field or a combination thereof.

15. The UE of claim 7, wherein one or both of the first control signaling or the second control signaling comprises radio resource control signaling.

16. The UE of claim 7, wherein, to receive the second control signaling, the one or more processors are configured to execute the code to cause the UE to:
receive second control signaling indicating a configured grant physical uplink shared channel configuration.

17. A method of wireless communication performed by a user equipment (UE), comprising:
receiving first control signaling indicating a first sounding reference signal (SRS) resource set and a second SRS resource set;
receiving second control signaling indicating a first SRS resource indicator without a second SRS resource indicator and indicating a first precoding and number of layers field without a second precoding and number of layers field; and
transmitting one or more uplink transmissions on a physical uplink shared channel using the first SRS resource set based on the second control signaling.

* * * * *